US011718764B2

(12) United States Patent
Martin et al.

(10) Patent No.: US 11,718,764 B2
(45) Date of Patent: Aug. 8, 2023

(54) COATING COMPOSITIONS, ELASTIC BARRIER COATINGS FORMED THEREFROM, AND METHODS OF APPLYING SUCH COATINGS

(71) Applicant: PPG Industries Ohio, Inc., Cleveland, OH (US)

(72) Inventors: Roxalana L. Martin, Pittsburgh, PA (US); Dennis L. Faler, North Huntingdon, PA (US); Jennifer Tamaki Jordan, Natrona Heights, PA (US); Mark P. Bowman, New Kensington, PA (US); Shanti Swarup, Allison Park, PA (US); Xiangling Xu, Pittsburgh, PA (US); Hongying Zhou, Allison Park, PA (US); Mark A. Tucker, Allison Park, PA (US)

(73) Assignee: PPG INDUSTRIES OHIO, INC., Cleveland, OH (US)

( * ) Notice: Subject to any disclaimer, the term of this patent is extended or adjusted under 35 U.S.C. 154(b) by 1338 days.

(21) Appl. No.: 16/086,232

(22) PCT Filed: Jan. 18, 2017

(86) PCT No.: PCT/US2017/013913
§ 371 (c)(1),
(2) Date: Sep. 18, 2018

(87) PCT Pub. No.: WO2017/180220
PCT Pub. Date: Oct. 19, 2017

(65) Prior Publication Data
US 2020/0239730 A1 Jul. 30, 2020

Related U.S. Application Data

(60) Provisional application No. 62/310,204, filed on Mar. 18, 2016.

(51) Int. Cl.
*B05D 1/02* (2006.01)
*B05D 3/02* (2006.01)
*B05D 3/06* (2006.01)
*B05D 7/00* (2006.01)
*C08K 3/013* (2018.01)
*C08K 5/00* (2006.01)
*C08L 33/10* (2006.01)
*C08L 75/02* (2006.01)
*C09D 175/06* (2006.01)

(52) U.S. Cl.
CPC ............ *C09D 175/06* (2013.01); *B05D 1/02* (2013.01); *B05D 3/02* (2013.01); *B05D 3/061* (2013.01); *B05D 7/56* (2013.01); *C08K 3/013* (2018.01); *C08K 5/0025* (2013.01); *C08L 33/10* (2013.01); *C08L 75/02* (2013.01); *C08K 2201/008* (2013.01); *C08L 2201/14* (2013.01);

*C08L 2203/16* (2013.01); *C08L 2205/03* (2013.01); *C08L 2207/53* (2013.01); *C08L 2312/00* (2013.01)

(58) Field of Classification Search
CPC .. C09D 175/02; C09D 175/04; C09D 175/06; C08L 75/02; C08L 75/04; C08L 75/06; C08L 2207/53
See application file for complete search history.

(56) References Cited

U.S. PATENT DOCUMENTS

| 3,279,936 | A | 10/1966 | Forestek |
| 4,704,176 | A | 11/1987 | Botzman |
| 4,983,662 | A | 1/1991 | Overbeek et al. |
| 5,709,918 | A | 1/1998 | Kimijima et al. |
| 6,309,494 | B1 | 10/2001 | Koch et al. |
| 6,552,117 | B2 | 4/2003 | Moos et al. |
| 8,716,402 | B2 | 5/2014 | Temple et al. |
| 8,722,788 | B2 | 5/2014 | Schultes et al. |
| 8,846,156 | B2 | 9/2014 | Swarup et al. |
| 11,015,084 | B2* | 5/2021 | Faler ................ C09D 7/63 |
| 2002/0157761 | A1 | 10/2002 | Bender et al. |
| 2005/0287348 | A1* | 12/2005 | Faler ................ B32B 5/18 428/323 |
| 2007/0276068 | A1 | 11/2007 | Hintzer et al. |
| 2010/0174032 | A1 | 7/2010 | Temple et al. |
| 2011/0070374 | A1 | 3/2011 | Ambrose et al. |

(Continued)

FOREIGN PATENT DOCUMENTS

| CN | 103485179 | | 1/2014 |
| DE | 3016710 | A1 | 11/1980 |

(Continued)

OTHER PUBLICATIONS

Burfield, David R. Journal of Chemical Education vol. 64 pp. 875 (Year: 1987).*
Jin et al., "Better Rubber to Substrate Adhesion via Better Interfacial Chemistry", Fall 178th Technical Meeting of the Rubber Division of the American Chemical Society, Inc., Oct. 2010, pp. 1-19.
Navarro-Bañón et al., "Water-based chlorination treatment of SBS rubber soles to improve their adhesion to waterborne polyurethane adhesives in the footwear industry", Journal of Adhesion Science and Technology, 2005, pp. 947-974, vol. 19:11.

*Primary Examiner* — Irina S Zemel
*Assistant Examiner* — Jeffrey S Lenihan

(57) ABSTRACT

A coating composition includes an aqueous carrier medium, at least a first polymer, and polymeric core-shell particles dispersed in the aqueous carrier medium. The first polymer includes: (i) a barrier segment having aromatic groups and urethane linkages, urea linkages, or a combination thereof; and (ii) an elastomeric segment having a glass transition temperature of less than 0° C. The barrier segment can make up at least 30% of the first polymer, based on the total solids weight of the first polymer.

19 Claims, No Drawings

(56) References Cited

U.S. PATENT DOCUMENTS

2015/0083297 A1    3/2015   Inata et al.
2015/0368512 A1    12/2015   Bowman et al.

FOREIGN PATENT DOCUMENTS

| | | |
|---|---|---|
| DE | 3416690 A1 | 1/1986 |
| EP | 0140118 A1 | 5/1985 |
| EP | 1454971 B1 | 2/2006 |
| GB | 724054 | 2/1955 |
| GB | 752655 | 7/1956 |
| JP | 8309879 A | 11/1996 |
| JP | 10264607 A | 10/1998 |
| JP | 11501586 A | 2/1999 |
| JP | 2001138459 A | 5/2001 |
| JP | 3501417 B2 | 3/2004 |
| JP | 2012101611 A | 5/2012 |
| JP | 2012101612 A | 5/2012 |
| JP | 5189694 B1 | 4/2013 |
| RU | 2254351 C2 | 6/2005 |
| RU | 2007122279 A | 12/2008 |
| RU | 2439103 C2 | 1/2012 |

\* cited by examiner

COATING COMPOSITIONS, ELASTIC BARRIER COATINGS FORMED THEREFROM, AND METHODS OF APPLYING SUCH COATINGS

CROSS REFERENCE TO RELATED APPLICATIONS

This application claims the benefit of U.S. Provisional Application No. 62/310,204 filed Mar. 18, 2016, which is incorporated herein by reference in its entirety.

NOTICE OF GOVERNMENT SUPPORT

This invention was made with Government support under Contract No. DE-EE-0005359 awarded by the Department of Energy. The United States government has certain rights in this invention.

FIELD OF THE INVENTION

The present invention relates to coating compositions, elastic barrier coatings formed from the coating compositions, and methods of preparing and applying elastic barrier coatings.

BACKGROUND OF THE INVENTION

Barrier coatings are used in a variety of industries to reduce permeation of vapor, gas, and/or chemicals through a substrate. For instance, barrier coatings are typically applied to tires and to bladders of sporting equipment such as shoes and balls to reduce the ingress and egress of gas. While barrier coatings can reduce the permeation of vapor, gas, and/or chemicals, they are generally brittle at low temperatures such as at −40° C. and, therefore, have a negative effect on the elasticity of the substrate. It is, therefore, desirable to develop improved coatings that provide good elasticity and gas barrier performance at both high and low temperatures. The present invention, therefore, aims to provide coating compositions from which barrier coatings can be formed, which exhibit good elasticity and barrier properties at ambient and elevated temperatures, as well as at substantially lower temperatures.

SUMMARY OF THE INVENTION

The present invention is directed to a coating composition for forming an elastic barrier coating. The coating composition includes an aqueous medium, at least a first polymer, and polymeric core-shell particles dispersed in the aqueous carrier medium. The first polymer comprises: (i) a barrier segment comprising aromatic groups and urethane linkages, urea linkages, or a combination thereof; and (ii) an elastomeric segment that is different from (i) having a glass transition temperature of less than 0° C. The barrier segment comprises at least 30 weight % of the polymer based on the total solids weight of the polymer.

The present invention is also directed to a method of applying a coating to a substrate. The methods includes: (a) applying the above-described coating composition to a first substrate; (b) removing substantially all water of the coating composition to evaporate and form an elastic barrier film; (c) removing the elastic barrier film from the first substrate; and (d) applying the elastic barrier film to a second substrate.

The present invention is further directed to a multi-layer coating that includes at least a first coating layer and a second coating layer. The first coating layer is formed from a first coating composition that includes: (1) the above-described coating composition; or (2) a polysulfide and a second polymer having an oxygen permeance of 40 or less cc·mm/m²·day·atm at 23° C. and 50% relative humidity; or (3) a combination thereof. The second coating layer comprises an oxygen permeance number (cc·mm/m²·day·atm) at 23° C. and 50% relative humidity that is lower than an oxygen permeance (cc·mm/m²·day·atm) at 23° C. and 50% relative humidity of the first coating layer. Further, the first coating layer is applied over at least a portion of a substrate and the second coating layer is applied over at least a portion of the first coating layer, or the second coating layer is applied over at least a portion of a substrate and the first coating layer is applied over at least a portion of the second coating layer.

The present invention is also directed to a coating composition for forming an elastic barrier coating. The coating compositions includes an aqueous carrier medium, at least a first polymer, polymeric core-shell particles dispersed in the aqueous carrier medium comprising a polymeric core at least partially encapsulated by a polymeric shell, and a crosslinker reactive with at least one of the first polymer and the core-shell particles. The first polymer comprises: (i) a barrier segment comprising aromatic groups and urethane linkages, urea linkages, or a combination thereof; and (ii) an elastomeric segment comprising ester linkages, ether linkages, or a combination thereof. The barrier segment comprises at least 30 weight % of the polymer based on the total solids weight of the polymer. Further, the polymeric core of the core-shell particles comprises a (meth)acrylate polymer and the polymeric shell of the core-shell particles comprises (i) urethane and urea linkages and (ii) keto functional groups, aldo functional groups, carboxylic acid functional groups, or a combination thereof. In addition, at least a portion of the polymeric shell is covalently bonded to at least a portion of the polymeric core.

The present invention also relates to a substrate at least partially coated with a coating formed (for example, by the above-mentioned method) from a coating composition according to the present invention or with the above-described multi-layer coating.

DESCRIPTION OF THE INVENTION

The present invention relates to a coating composition comprising (i) a polymer having barrier segment(s) and elastomeric segment(s), and (ii) polymeric core-shell particles dispersed in an aqueous medium. As used herein, a "polymer" refers to oligomers and homopolymers (e.g., prepared from a single monomer species), copolymers (e.g., prepared from at least two monomer species), and graft polymers. The term "resin" is used interchangeably with the term "polymer."

Further, the term "barrier segment", with respect to a polymer, refers to a section or sections on the backbone of a polymer that imparts a vapor barrier, gas barrier, and/or chemical barrier when formed into a coating. For example, a polymer comprising the barrier segment(s) can be applied as a coating over the substrate to provide a vapor barrier, gas barrier, and/or chemical barrier. "Vapor barrier" refers to a barrier and/or low permeability to liquid and/or its vapor. "Gas barrier" refers to a barrier and/or low permeability to oxygen, nitrogen, argon, carbon dioxide, and/or other gases. "Chemical barrier" refers to a barrier and/or low permeability to the migration of a molecule from one substrate to another, and/or from within a substrate, e.g. from its interior to its surface or vice versa. Any resistance to permeation of vapor, gas, and/or chemical(s) is sufficient to qualify a coating as a "barrier coating" according to the present invention.

The gas barrier properties of a substrate, and/or any coatings thereon, are typically described in terms of the oxygen permeance ("P(O$_2$)"). The "P(02)" number quantifies the amount of oxygen that can pass through a substrate and/or coating under a specific set of conditions and is generally expressed in units of cc·mm/m$^2$·day·atm. This is a standard unit of permeation measured as cubic centimeters of oxygen permeating through one millimeter thickness of a sample, of an area of a square meter, over a 24 hour period, under a partial pressure differential of one atmosphere at 23° C. and 50% relative humidity (R. H.) conditions.

The barrier segment(s) of the polymer contained in the coating composition according to the present invention generally comprise(s) aromatic groups as well as urethane linkages, urea linkages, or combinations thereof. In some examples, the polymer is a polyurethane based polymer comprising aromatic groups, urethane linkages and, optionally, urea linkages that form the barrier segment(s) and additional different segment(s) that form the elastomeric segment(s). The polyurethane based polymer can be formed according to any method known in the art, such as by reacting at least one polyisocyanate with one or more compound(s) having functional groups that are reactive with the isocyanate functionality of the polyisocyanate. Reactive functional groups can be active hydrogen-containing functional groups such as hydroxyl groups, thiol groups, amine groups, and acid groups like carboxylic acid groups. A hydroxyl group may for example react with an isocyanate group to form a urethane linkage. A primary or secondary amine group may react with an isocyanate group to form a urea linkage. Generally the reaction mixture includes at least one hydroxyl-functional reactive compound such as a polyol for formation of urethane functionality. Typically the compound(s) having functional groups that are reactive with the isocyanate functionality of the polyisocyanate comprise at least one compound having two or more active hydrogen-containing functional groups, e.g. selected from those mentioned above, per molecule.

Non-limiting examples of such reactive compounds include polyols, polyisocyanates, compounds containing carboxylic acid groups including diols containing carboxylic acid groups, polyamines, polythiols, and/or other compounds having reactive functional groups, such as hydroxyl groups, thiol groups, amine groups, and carboxylic acids. In some examples, an aromatic polyisocyanate and/or an aromatic compound(s) having functional groups that are reactive with the isocyanate functionality of the polyisocyanate are used in the preparation of the polymer to introduce aromatic barrier segment(s) in the polyurethane polymer.

It is appreciated that polyamines and other art recognized compounds can be used as a chain extender. As used herein, a "chain extender" refers to a lower molecular weight compound having two or more functional groups that are reactive towards isocyanate.

Polyisocyanates that can be used in the preparation of the polymer having barrier and elastomeric segments include aliphatic and aromatic diisocyanates as well as higher functional polyisocyanates. Non-limiting examples of suitable polyisocyanates include isophorone diisocyanate (IPDI), dicyclohexylmethane 4,4'-diisocyanate (H12MDI), cyclohexyl diisocyanate (CHDI), m-tetramethylxylylene diisocyanate (m-TMXDI), p-tetramethylxylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), toluene diisocyanate (TDI), m-xylylenediisocyanate (MXDI) and p-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, xylylene diisocyanate (XDI), and mixtures or combinations thereof. A polyisocyanate that comprises one or more aromatic group(s) such as toluene diisocyanate (TDI), m-xylylenediisocyanate (MXDI), p-xylylenediisocyanate, and/or 4,4'-dibenzyl diisocyanate can also be used in the preparation of the polymer to form aromatic barrier segment(s).

Examples of polyols that can be used to prepare the polyurethane based polymer include, but are not limited to, polyether polyols, polyester polyols, copolymers thereof, as well as other compounds that comprise two or more hydroxyl groups, and combinations of any of the foregoing. Non-limiting examples of suitable polyether polyols include polytetrahydrofuran, polyethylene glycol, polypropylene glycol, polybutylene glycol, copolymers thereof, and combinations thereof.

Non-limiting examples of polyester polyols include those prepared from a polyol such as a polyol comprising one or more of an ether moiety and a carboxylic acid or anhydride. Suitable polyols include, for example, ethylene glycol, oligomers of ethylene glycol (including diethylene glycol, triethylene glycol and tetraethylene glycol), propylene glycol, and oligomers of propylene glycol (including dipropylene glycol, tripropylene glycol, and tetrapropylene glycol).

Other suitable polyols include, but are not limited to, 1,6-hexanediol, cyclohexanedimethanol, 2-ethyl-1,6-hexanediol, 1,4-butanediol, 1,3-propanediol, 1,4-butanediol, neopentyl glycol, dihydroxyalkylated aromatic compounds such as the bis (2-hydroxyethyl) ethers of hydroquinone and resorcinol (HER) which is also referred to as 1,3-bis(2-hydroxyethoxy) benzene, p-xylene-α,α'-diol, the bis (2-hydroxyethyl) ether of p-xylene-α,α'-diol, m-xylene-α,α'-diol and the bis (2-hydroxyethyl) ether of m-xylene-α,α'-diol, trimethylol propane, 1,2,6-hexantriol, glycerol, and combinations thereof.

Suitable carboxylic acids, which can be reacted with the polyols to form a polyester polyol include, but are not limited to, glutaric acid, succinic acid, malonic acid, oxalic acid, phthalic acid, isophthalic acid, hexahydrophthalic acid, adipic acid, maleic acid, and mixtures thereof. Another non-limiting example of a suitable carboxylic acid is a furandicarboxylic acid such as 2,5-furandicarboxylic acid, which can be reacted with an excess of polyols to form polyols containing furan-diester moieties. Anhydrides of these and any other carboxylic acid can also be used.

Furthermore, suitable carboxylic acid groups containing diols that can be used with the present invention include, but are not limited to, 2,2-bis(hydroxymethyl)propionic acid which is also referred to as dimethylolpropionic acid (DMPA), 2,2-bis(hydroxymethyl)butyric acid which is also referred to as dimethylol butanoic acid (DMBA), diphenolic acid, and combinations thereof.

Suitable polyamines that can be used to prepare the polyurethane based polymer include aliphatic and aromatic compounds, which comprise two or more amine groups selected from primary and secondary amine groups. Examples include, but are not limited to, ethylenediamine, hexamethylenediamine, 1,2-propanediamine, 2-methyl-1,5-penta-methylenediamine, 2,2,4-trimethyl-1,6-hexanediamine, isophoronediamine, diaminocyclohexane, xylylenediamine, 1,12-diamino-4,9-dioxadodecane, p-phenylenediamine, m-phenylenediamine, benzidine, 4,4'-methylenedianiline, 4,4'-methylenibis (2-chloroaniline), and combinations thereof.

Suitable amino alcohols that can be used to prepare the polyurethane based polymer include, but are not limited to, ethanolamine, propanolamine, butanolamine, and combinations thereof.

As previously described, the first polymer comprises aromatic groups which have been found to increase the barrier properties of a coating formed from a coating composition of the present invention including with the first polymer. As used herein, the term "aromatic" refers to a cyclically conjugated moiety with a stability (due to delocalization) that is significantly greater than that of a hypothetical localized structure. The aromatic ring can include aromatic carbocyclic or heteroaromatic ring structures. An "aromatic carbocyclic ring" refers to an aromatic ring with the aromatic group completely formed by bonded carbon atoms, and a "heteroaromatic ring" refers to an aromatic ring with at least one carbon atom of the aromatic group replaced by a heteroatom such as nitrogen, oxygen, sulfur, or a combination thereof. The aromatic groups can be incorporated into the final polymer through any of the previously described components used to form the polymer. For example, aromatic groups can be introduced into the backbone of the final polymer with: hydroxyl containing compounds having aromatic groups such as bis(2-hydroxyethyl) ethers of hydroquinone resorcinol (HER) and diols containing furan rings; polyisocyanates having aromatic groups such as tetramethylxylylene diisocyanates or TDI; polyamines having aromatic groups such as xylylene diamines; and combinations thereof. In some examples, the first polymer is a polyurethane based polymer having aromatic groups and which is prepared from a reaction mixture comprising (i) an aromatic diisocyanate and (ii) an aliphatic polyester polyol or an aliphatic polyether polyol, and (iii) optional further components such as aromatic or aliphatic polyol components including carboxyl-functional diols, and/or polyamines.

Further, the aromatic groups incorporated into the polymer can comprise a six-membered aromatic ring that is substituted at any position such as the ortho, meta, and/or para position. For example, the aromatic groups used to form the polymer can comprise a meta substituted six-membered aromatic ring. Non-limiting examples of meta substituted six membered aromatic rings include bis(2-hydroxyethyl)ethers of hydroquinone resorcinol (HER), tetramethylxylylene diisocyanate, and m-xvlylenediamine. It is appreciated that the aromatic groups incorporated into the polymer are not limited to six-membered rings and can be selected from other membered rings including, but are not limited to, five-membered aromatic rings such as furan containing compounds as previously described.

The first polymer used in the coating composition according to the present invention can comprise at least 10 weight %, at least 20 weight %, or at least 30 weight % of aromatic materials, based on the total solids weight of the polymer. For example, the polymer can comprise at least 10 weight %, at least 20 weight %, or at least 30 weight % of meta-substituted aromatic materials. The percent of aromatic material can be determined, for example, by adding the weight of all the monomers containing aromatic material such as a meta-substituted aromatic group, dividing that number by the total solid weight of the final resin and multiplying by 100. For example, for a polymer made from 200 g of bis(2-hydroxyethyl)ether of hydroquinone resorcinol (HER), 250 g of tetramethylxylylene diisocyanate, and 550 g of a polyether polyol, add the weights of the two aromatic monomers (200 g plus 250 g), divide by the total weight (1000 g), and multiply by 100 to obtain 45% aromatic material.

Any combination of the previously described components can be used to form the barrier segment(s) of the polymer. For example, polyols (such as 1,3-bis(2-hydroxyethoxy) benzene) can be reacted with polyisocyanates (such as TDI) to form urethane linkages and polyamines (such as m-xvlylenediamine) can be reacted with polyisocyanates to form urea linkages. It is appreciated that one or more of the polyols, polyisocyanates, and/or polyamines can provide aromatic groups to the polyurethane. It is further appreciated that the polyol that contributes to the formation of the barrier segments can also provide the elastomeric segments of the final polymer. For instance, a polyol can be reacted with an isocyanate to form urethane moieties (as part of the barrier segment) while the remaining residual moiety (e.g. the polyether or polyester backbone) forms an elastomeric segment.

The barrier segment of the final polymer can have a glass transition temperature ($T_g$) of greater than 0° C., greater than 10° C., or greater than 20° C. The glass transition temperature ($T_g$) is determined by dynamic mechanical analysis using a model QA800 Dynamic Mechanical Analysis made by TA Instruments (New Castle, Del.) using the following parameters: mode: tension film, amplitude: 20 μm, frequency: 1 Hz, clamping force: 15 cNm, temperature cycle: −100° C. to 175° C., heating rate: 3° C./min., sample dimensions: 15.0 length x~6.5 width (mm).

Further, the barrier segment(s) can comprise at least 30 weight % or at least 40 weight % of the first polymer, based on the total solids weight of the first polymer. The barrier segment(s) can also comprise up to 70 weight % or up to 60 weight % of the first polymer, based on the total solids weight of the first polymer. The first polymer may for example comprise the barrier segment(s) in an amount of from 30 weight % to 70 weight % or from 40 weight % to 60 weight %, based on the total solids weight of the first polymer.

As indicated, the first polymer also includes elastomeric segment(s). The term "elastomeric segment", with respect to a polymer, refers to a section or sections on the backbone of a polymer that imparts a degree of elasticity that is higher than that of the barrier segment in the polymer and which helps provide the elastomeric properties in a coating formed from a coating composition containing the polymer such as when a coating formed from a coating composition containing the polymer is applied over a substrate. "Elastomeric" and like terms as used herein refer to materials that impart elasticity. "Elasticity" and like terms refer to the ability of a material to return to its approximate original shape or volume after the material has been deformed, such as for example stretched.

The elastomeric properties of a substrate, and/or any coatings thereon, are typically described in terms of the elongation at break. "Elongation at break" and like terms refer to the amount of elongation a substrate or coating can withstand prior to breaking or cracking. Elongation at break is determined with an INSTRON® model 4443 SFL unit with a temperature controlled test chamber (commercially available from Instron Corp.). The test rate for elongation at break measurements at −40° C. is run at 5 mm/minute and the test rate for elongation at break measurements at room temperature is run at 50 mm/minute.

The elastomeric segment(s) of the first polymer are different from the barrier segment(s). The elastomeric segment(s) can, for example, comprise ester linkages, ether linkages, sulfide linkages, natural rubber, synthetic rubber, or combinations thereof. For example, the elastomeric segment(s) of the polymer can be formed by ester linkages from a polyester, ether linkages from a polyether, sulfide linkages from a polysulfide, rubber based polymers, copolymers thereof, or combinations thereof.

Non-limiting examples of polyethers and polyesters suitable for forming the elastomeric segment(s) include any of the polyethers and polyesters previously described. Non-limiting examples of suitable polysulfides are commercially available under the trade name THIOPLAST®, a liquid polysulfide polymer, supplied by Akzo Nobel, Greiz, Germany. Other suitable polysulfides can include polysulfides described in "Sealants" by Adolfas Damusis, Reinhold Publishing Corp., 1967, at pages 175-195, which is incorporated by reference herein. Polysulfides are also described in U.S. Patent Application Publication No. 2015/0368512 at paragraphs [0025] to [0030], which is incorporated by reference herein.

Non-limiting examples of rubber based polymers include cis-1,4-polyisoprene rubber, styrene/butadiene copolymers, polybutadiene rubber, styrene/isoprene/butadiene rubber, butyl rubber, halobutyl rubber, and combinations thereof.

The elastomeric segment(s) of the first polymer can have a glass transition temperature ($T_g$) of less than 0° C., less than −20° C., or less than −50° C. The glass transition temperature ($T_g$) is determined by dynamic mechanical analysis with a model QA800 Dynamic Mechanical Analysis made by TA Instruments (New Castle, Del.) as previously described.

Further, the elastomeric segment(s) can comprise at least 30 weight % or at least 40 weight % of the first polymer, based on the total solids weight of the first polymer. The elastomeric segment(s) can also comprise up to 70 weight % or up to 60 weight % of the first polymer, based on the total solids weight of the first polymer. The first polymer may, for example, comprise the elastomeric segment(s) in an amount of from 30 weight % to 70 weight % or from 40 weight % to 60 weight %, based on the total solids weight of the first polymer.

The first polymer comprising barrier and elastomeric segments can be prepared by reacting any of the previously described components that form the barrier and elastomeric segments. For example, the final polymer can be prepared by reacting a polyester or polyether polyol, other hydroxyl containing compounds such as 1,3-bis(2-hydroxyethoxy) benzene, a polyisocyanate, acid containing diols such as dimethylolpropionic acid (DMPA), and, optionally, diamine compounds. Such polymers can have barrier segment(s) formed by aromatic groups, urethane linkages, and optionally urea linkages as well as elastomeric segment(s) formed by the ester or ether linkages.

The first polymer can also have a particular polymer architecture. For example, the first polymer comprising barrier and elastomeric segments can have a linear random copolymer architecture or a linear block copolymer architecture. As used herein, a "random copolymer" refers to a polymer with multiple monomer units arranged in an irregular, random order. A "block copolymer" refers to a polymer with multiple sequences, or blocks, of the same monomer alternating in series with at least another block having different monomers. The block copolymer can be a diblock copolymer (copolymer with two types of blocks), a triblock copolymer (copolymer with three types of blocks), a multiblock copolymer (copolymer with four or more types of blocks), and combinations thereof. In some examples, the first polymer is a block copolymer comprising: at least one block having aromatic groups and urethane linkages, urea linkages, or a combination thereof; and at least a second different block having ester linkages, ether linkages, or a combination thereof.

Further, the first polymer comprising barrier and elastomeric segments can comprise one or more, such as two or more, reactive functional groups. The term "reactive functional group" refers to an atom, group of atoms, functionality, or group having sufficient reactivity to form at least one covalent bond with another reactive group in a chemical reaction. Non-limiting examples of reactive functional groups include carboxylic acid groups, keto functional groups (also referred to as ketone functional groups), aldo functional groups (also referred to as aldehyde functional groups), amine groups, epoxide groups, hydroxyl groups, thiol groups, carbamate groups, amide groups, urea groups, isocyanate groups (including blocked isocyanate groups), ethylenically unsaturated groups, and combinations thereof. As used herein, "ethylenically unsaturated" refers to a group having at least one carbon-carbon double bond. Non-limiting examples of ethylenically unsaturated groups include, but are not limited to, (meth)acrylate groups, vinyl groups, and combinations thereof. As used herein, the term "(meth) acrylate" refers to both the methacrylate and the acrylate.

It is appreciated that the first polymer comprising barrier and elastomeric segments can also be free of (i.e., does not contain) any of the previously described reactive functional groups. For example, the final polymer comprising barrier and elastomeric segments can be free of ethylenically unsaturated reactive groups such as (meth)acrylate groups.

The first polymer can be dispersed in an aqueous medium to form a dispersion. The polymer dispersion is then combined with other components to form the coating composition. The first polymer can be dispersed or dissolved in the aqueous carrier medium of the coating composition of the present invention. As used herein, the term "aqueous" refers to a liquid medium, e.g. the aqueous carrier medium of the coating composition of the present invention, comprising at least 50 weight % water, based on the total weight of the liquid medium. Such aqueous liquid mediums can comprise at least 60 weight % water, or at least 70 weight % water, or at least 80 weight % water, or at least 90 weight % water, or at least 95% water, based on the total weight of the liquid medium. The aqueous medium optionally comprises one or more organic solvent(s) that make up less than 50 weight % of the liquid medium include organic solvents. Non-limiting examples of suitable organic solvents include polar organic solvents, e.g. protic organic solvents such as glycols, glycol ether alcohols, alcohols; and volatile ketones, glycol diethers, esters, and diesters. Other non-limiting examples of organic solvents include aromatic and aliphatic hydrocarbons.

In order to enhance water-dispersibility and stability of the first polymer in the aqueous medium, the first polymer can comprise water-dispersible groups such as hydrophilic groups. For example, the first polymer can comprise carboxylic acid functional groups, such as by using carboxylic acid groups containing diols to form the first polymer. The carboxylic acid functional groups can be at least partially neutralized (i.e., at least 30 percent of the total neutralization equivalent) by an inorganic base, such as a volatile amine, to form a salt group. Examples of suitable amines are ammonia, dimethylamine, trimethylamine, monoethanolamine, and dimethylethanol amine. It is appreciated that the amines will evaporate during the formation of the coating to expose the carboxylic acid functional groups and allow the carboxylic acid functional groups to undergo further reactions such as with a crosslinking agent reactive with the carboxylic acid functional groups. Other non-limiting examples of water-dispersible groups include polyoxyalkylene groups.

The polymer having barrier and elastomeric segments can comprise a weight average molecular weight of at least 5,000 g/mol, at least 10,000 g/mol, at least 15,000 g/mol, or at least 20,000 g/mol. The weight average molecular weight is determined by gel permeation chromatography versus a polystyrene standard with tetrahydrofuran as the mobile phase.

Other non-limiting examples of polyurethane based dispersions that can be used are described in U.S. Pat. No. 8,716,402 at column 2, line 13 to column 4, line 33, which is incorporated by reference herein.

The coating composition according to the present invention can comprise the first polymer having barrier and elastomeric segments in an amount of at least 40 weight %, such as at least 50 weight %, or at least 60 weight %, based on the total solids weight of the coating composition. The coating composition according to the present invention can comprise the first polymer having barrier and elastomeric segments in an amount of up to 90 weight %, such as up to 80 weight %, or up to 70 weight %, based on the total solids weight of the coating composition. The coating composition of the present invention may for example comprise the first polymer having barrier and elastomeric segments in an amount of from 40 to 90 weight %, or from 50 to 80 weight %, or from 60 to 80 weight %, or from 70 to 80 weight %, based on the total solids weight of the coating composition.

As previously described, the coating composition of the present invention also comprises polymeric core-shell particles, which are dispersed in the aqueous carrier medium of the coating composition. In the core-shell particles, the core is at least partially encapsulated by the shell. A core-shell particle in which the core is at least partially encapsulated by the shell refers to a particle comprising (i) a first material that forms the center of the particle (i.e., the core) and (ii) a second material (i.e., the shell) that forms a layer over at least a portion of the surface of the first material (i.e., the core). In some examples, at least a portion of the shell directly contacts at least a portion of the core. Further, the core-shell particles can have various shapes (or morphologies) and sizes. For example, the core-shell particles can have generally spherical, cubic, platy, polyhedral, or acicular (elongated or fibrous) morphologies. The core-shell particles can also have an average particle size of 30 to 300 nanometers, or from 40 to 200 nanometers, or from 50 to 150 nanometers. As used herein, "average particle size" refers to volume average particle size. The average particle size is determined with a Zetasize 3000HS following the instructions in the Zetasize 3000HS manual.

The core-shell particles can comprise a polymeric core as well as a polymeric shell. A "polymeric core" means that the core of the core-shell particle comprises one or more polymers and a "polymeric shell" means that the shell of the core-shell particle comprises one or more polymers. The polymeric core may for example comprise a (meth)acrylate polymer, a vinyl polymer, or a combination thereof. The polymeric core can be formed by polymerization (e.g. by emulsion polymerization) of one or more ethylenically unsaturated monomers. Further, the backbone or main chain of a polymer that forms at least a portion of the polymeric shell can comprise urethane linkages, urea linkages, or combinations. For instance, the polymeric shell can comprise a polyurethane with a backbone that includes urethane linkages and, optionally, urea linkages. The polyurethane backbone can also comprise additional linkages including, but not limited to, ester linkages, ether linkages, and combinations thereof.

The polymeric core and polymeric shell that form the core-shell particles of the present invention can also comprise one or more, such as two or more, reactive functional groups. The reactive functional groups can include, but are not limited to, any of the reactive functional groups previously described with respect to the polymer having barrier and elastomeric segments. For example, the polymeric core and polymeric shell can each independently comprise one or more reactive functional groups selected from carboxylic acid groups, keto functional groups (also referred to as ketone functional groups), aldo functional groups (also referred to as aldehyde functional groups), amine groups, epoxide groups, hydroxyl groups, thiol groups, carbamate groups, amide groups, urea groups, isocyanate groups (including blocked isocyanate groups), ethylenically unsaturated groups, and combinations thereof. It is appreciated that the polymeric shell, polymeric core, or both, can be free of (i.e., does not contain) any of the previously described reactive functional groups.

The polymeric core and polymeric shell of the core-shell particles can be prepared to provide a hydrophilic polymeric shell with enhanced water-dispersibility/stability and a hydrophobic polymeric core. As such, the polymeric shell can comprise hydrophilic water-dispersible groups while the polymeric core can be free of hydrophilic water-dispersible groups. For example, the polymeric shell can comprise carboxylic acid functional groups that can be at least partially neutralized (i.e., at least 30 percent of the total neutralization equivalent) by an inorganic base, such as a volatile amine, to form a salt group as previously described, while the hydrophobic polymeric core can be free of carboxylic acid groups and salt groups formed therefrom. The hydrophilic water-dispersible groups can increase the water-dispersibility/stability of the polymeric shell in the aqueous medium so that the polymeric shell at least partially encapsulates the hydrophobic core.

In some examples, the polymeric core comprises a (meth)acrylate polymer and the polymeric shell comprises a polyurethane with pendant and/or terminal keto functional groups, aldo functional groups, carboxylic acid functional groups, or a combination thereof. A "pendant group" refers to a side group that is an offshoot from the side of the polymer backbone and which is not part of the polymer backbone. In contrast, a "terminal group" refers to a group on an end of the polymer backbone and which is part of the polymer backbone.

The polymeric shell can also be covalently bonded to at least a portion of the polymeric core. For example, the polymeric shell can be covalently bonded to the polymeric core by reacting at least one functional group on the monomers and/or prepolymers that are used to form the polymeric shell with at least one functional group on the monomers and/or prepolymers that are used to form the polymeric core. The functional groups can include any of the functional groups previously described provided that at least one functional group on the monomers and/or prepolymers that are used to form the polymeric shell is reactive with at least one functional group on the monomers and/or prepolymers that are used to form the polymeric core. For instance, the monomers and/or prepolymers that are used to form the polymeric shell and polymeric core can both comprise at least one ethylenically unsaturated group that are reacted with each other to form a chemical bond. As used herein, a "prepolymer" refers to a polymer precursor capable of further reactions or polymerization by one or more reactive groups to form a higher molecular mass or cross-linked state.

Various components can be used to form the core-shell particles of the present invention. For example, the core-shell particles can be formed from isocyanate functional polyurethane prepolymers, polyamines, and ethylenically unsaturated monomers and/or polymers. The isocyanate functional polyurethane prepolymers can be prepared according to any method known in the art, such as by reacting polyols, polyisocyanates, compounds containing carboxylic acid groups such as diols containing carboxylic acid groups, hydroxyl functional ethylenically unsaturated components such as hydroxyalkyl esters of (meth)acrylic acid, keto and/or aldo functional monoalcohols, and any of the compounds previously described regarding the preparation of water-dispersible polyurethanes.

Non-limiting examples of polyols, polyisocyanates, compounds containing carboxylic acid groups such as diols containing carboxylic acid groups, and various other compounds suitable for forming the core-shell particles include those previously described regarding the preparation of water-dispersible polyurethanes in the context of the first polymer. Non-limiting examples of hydroxyalkyl esters of (meth)acrylic acid include hydroxymethyl (meth)acrylate, hydroxyethyl (meth)acrylate, hydroxypropyl (meth)acrylate, hydroxybutyl (meth)acrylate, and combinations thereof. Further, non-limiting examples of keto functional monoalcohols include, but are not limited to, hydroxyacetone, 4-hydroxy-2-butanone, 5-hydroxy-4-octanone, and combinations thereof. Non-limiting examples of aldo functional monoalcohols include D-lactaldehyde solution, 4-hydroxy-pentanal, 5-hydroxy-hexanal, 5-hydroxy-5-methyl-hexanal, 4-hydroxy-4-methyl-pentanal, 3-hydroxy-3-methylbutanal, and combinations thereof.

The components that form the polyurethane prepolymer can be reacted in a stepwise manner, or they can be reacted simultaneously. For example, the polyurethane prepolymer can be formed by reacting a diisocyanate, a polyol, a carboxyl group-containing diol, a hydroxyl group-containing ethylenically unsaturated monomer, and, optionally, a keto functional monoalcohol simultaneously.

The polyurethane prepolymers can also be prepared in the presence of catalysts, polymerization inhibitors, and combinations thereof. Non-limiting examples of catalysts include triethylamine, N-ethyl morpholine, tributylamine, and the like, as well as tin type catalysts such as dibutyl tin dilaurate, dioctyl tin dilaurate, and the like. Polymerization inhibitors that can be used to prevent polymerization of the ethylenically unsaturated compounds during formation of the polyurethane include hydroquinone, hydroquinone monomethyl ether, p-benzoquinone, and the like.

As previously mentioned, the core-shell particles can also be prepared with polyamines and ethylenically unsaturated monomers and/or polymers not incorporated into the polyurethane prepolymers during preparation thereof. For instance, the isocyanate functional polyurethane prepolymers can be prepared as described above and then reacted with polyamines as a chain extender.

Suitable polyamines include the diamines previously described such as, for example, ethylenediamine, hexamethylenediamine, 1,2-propanediamine, 2-methyl-1,5-pentamethylenediamine, 2,2,4-trimethyl-1,6-hexanediamine, isophoronediamine, diaminocyclohexane, xylylenediamine, 1,12-diamino-4,9-dioxadodecane, and combinations thereof.

Other non-limiting examples of suitable polyamine functional compounds include the Michael addition reaction products of a polyamine functional compound, such as a diamine, with keto and/or aldo group containing ethylenically unsaturated monomers. The polyamine functional compound typically comprises at least two primary amino groups (i.e., a functional group represented by the structural formula —$NH_2$), and the keto and/or aldo group containing ethylenically unsaturated monomers include, but are not limited to, (meth)acrolein, diacetone (meth)acrylamide, diacetone (meth)acrylate, acetoacetoxyethyl (meth)acrylate, vinyl acetoacetate, crotonaldehyde, 4-vinylbenzaldehyde, and combinations thereof. The resulting Michael addition reaction products can include a compound with at least two secondary amino groups (i.e., a functional group represented by the structural formula —NRH in which R is a hydrocarbon) and at least two keto and/or aldo functional groups. It is appreciated that the secondary amino groups will react with the isocyanate functional groups of the polyurethane prepolymers to form urea linkages and chain extend the polyurethanes. Further, the keto and/or aldo functional groups will extend out from the backbone of the chain-extended polyurethane, such as from the nitrogen atom of the urea linkage for example, to form a polyurethane with pendant keto and/or aldo functional groups. The Michael addition reaction products can also be used to form the polymers comprising barrier and elastomeric segments previously described.

It is appreciated that the polyurethane prepolymers/chain extended polymers used to form at least a portion of the core-shell particles are generally different from the polyurethane polymers having barrier and elastomeric segments previously described. Thus, the polyurethane prepolymers/chain extended polymers used to form at least a portion of the core-shell particles have different types or amounts of groups and/or segments as well as different properties than the polymers having barrier and elastomeric segments previously described. For example, the polyurethane prepolymers/chain extended polymers used to form at least a portion of the core-shell particles can be free of aromatic groups. It is appreciated that the entire structure of the core-shell particles can be free of aromatic groups. The polyurethane prepolymers/chain extended polymers used to form at least a portion of the core-shell particles can also have different reactive functional groups such as ethylenically unsaturated groups, while the polyurethane polymers having barrier and elastomeric segments can be free of such groups.

After forming the polyurethane prepolymer/chain extended polymer, the polyurethane and additional ethylenically unsaturated monomers can be subjected to a polymerization process to form the core-shell particles. The additional ethylenically unsaturated monomers can be added after forming the chain extended polyurethane. Alternatively, the additional ethylenically unsaturated monomers can be used as a diluent during preparation of the polyurethane prepolymer and not added after formation of the chain extended polyurethane. It is appreciated that ethylenically unsaturated monomers can be used as a diluent during preparation of the polyurethane prepolymer and also added after formation of the polyurethane.

The additional ethylenically unsaturated monomers can comprise multi-ethylenically unsaturated monomers, mono-ethylenically unsaturated monomers, or combinations thereof. A "mono-ethylenically unsaturated monomer"

refers to a monomer comprising only one ethylenically unsaturated group, and a "multi-ethylenically unsaturated monomer" refers to a monomer comprising two or more ethylenically unsaturated groups.

Non-limiting examples of ethylenically unsaturated monomers include, but are not limited to, alkyl esters of (meth)acrylic acid, hydroxyalkyl esters of (meth)acrylic acid, acid group containing unsaturated monomers, vinyl aromatic monomers, aldo or keto containing unsaturated monomers, and combinations thereof.

Non-limiting examples of alkyl esters of (meth)acrylic acid include methyl (meth)acrylate, ethyl (meth)acrylate, butyl (meth)acrylate, isobutyl (meth)acrylate, ethylhexyl (meth)acrylate, lauryl (meth)acrylate, octyl (meth)acrylate, glycidyl (meth)acrylate, isononyl (meth)acrylate, isodecyl (meth)acrylate, vinyl (meth)acrylate, acetoacetoxyethyl (meth)acrylate, acetoacetoxypropyl (meth)acrylate, and combinations thereof. Other non-limiting examples include di(meth)acrylate alkyl diesters formed from the condensation of two equivalents of (meth)acrylic acid such as, for example, ethylene glycol di(meth)acrylate. Di(meth)acrylate alkyl diesters formed from $C_{2-24}$ diols such as butane diol and hexane diol can also be used.

Non-limiting examples of hydroxyalkyl esters of (meth) acrylic acid, and keto and aldo containing unsaturated monomers include any of those previously described. Non-limiting examples of acid group containing unsaturated monomers include (meth)acrylic acid, itaconic acid, maleic acid, fumaric acid, crotonic acid, aspartic acid, malic acid, mercaptosuccinic acid, and combinations thereof.

Non-limiting examples of vinyl aromatic monomers include styrene, 2,4-dimethyl styrene, ethyl styrene, isopropylstyrene, butyl styrene, vinyl naphthalene, vinyl toluene, divinyl aromatic monomers such as divinyl benzene, and combinations thereof.

As previously noted, the ethylenically unsaturated monomers can be polymerized in the presence of the chain extended polyurethane, which can also contain ethylenically unsaturated groups, to form the core-shell particles. The polymerization can be conducted using art recognized techniques as well as conventional additives such as emulsifiers, protective colloids, free radical initiators, and chain transfer agents known in the art.

In some examples, the core-shell particles of the present invention are prepared with: (i) ethylenically unsaturated monomers; (ii) polyurethane prepolymers comprising isocyanate functional groups, carboxylic acid functional groups, and ethylenically unsaturated groups; and (iii) optionally, a diamine. The resulting core-shell particles comprise a polymeric core prepared from ethylenically unsaturated monomers that is covently bonded to at least a portion of a polyurethane shell having pendant carboxylic acid functional groups, urethane linkages, and, optionally, urea linkages. For enhanced water-dispersibility/stability, the carboxylic acid functional groups on the polymeric shell can be at least partially neutralized (i.e., at least 30 percent of the total neutralization equivalent) by an inorganic base, such as a volatile amine, to form a salt group as previously described. The polymeric core can also include pendant and/or terminal functional groups, such as keto and/or aldo functional groups, by using ethylenically unsaturated monomers that contain additional functional groups. Alternatively, the polymeric core can be free of additional functional groups such as keto and/or aldo functional groups.

The core-shell particles of the present invention can also be prepared with: (i) ethylenically unsaturated monomers; (ii) polyurethane prepolymers comprising isocyanate functional groups, carboxylic acid functional groups, and ethylenically unsaturated groups; and (iii) the Michael addition reaction product of a diamine and keto and/or aldo containing unsaturated monomers. The resulting core-shell particles comprise a polymeric core prepared from ethylenically unsaturated monomers that is covently bonded to at least a portion of a polyurethane shell having pendant carboxylic acid functional groups, pendant keto and/or aldo functional groups, urethane linkages, and urea linkages. For enhanced water-dispersibility/stability, the carboxylic acid functional groups on the polymeric shell can be at least partially neutralized (i.e., at least 30 percent of the total neutralization equivalent) by an inorganic base, such as a volatile amine, to form a salt group as previously described. The polymeric core can also include pendant and/or terminal functional groups, such as keto and/or aldo functional groups, by using ethylenically unsaturated monomers that contain additional functional groups. Alternatively, the polymeric core can be free of additional functional groups such as keto and/or aldo functional groups.

Further, the core-shell particles of the present invention can be prepared with: (i) ethylenically unsaturated monomers; (ii) polyurethane prepolymers comprising isocyanate functional groups, carboxylic acid functional groups, terminal keto and/or aldo functional groups, and ethylenically unsaturated groups; and (iii) a diamine. The resulting core-shell particles comprise a polymeric core prepared from ethylenically unsaturated monomers and a polyurethane shell having pendant carboxylic acid functional groups, terminal keto and/or aldo functional groups, urethane linkages, and urea linkages. For enhanced water-dispersibility/stability, the carboxylic acid functional groups on the polymeric shell can be at least partially neutralized (i.e., at least 30 percent of the total neutralization equivalent) by an inorganic base, such as a volatile amine, to form a salt group as previously described. The polymeric core can also include pendant and/or terminal functional groups, such as keto and/or aldo functional groups, by using ethylenically unsaturated monomers with additional functional groups. Alternatively, the polymeric core can be free of additional functional groups such as keto and/or aldo functional groups.

Further, the polymeric core can be covalently bonded to at least a portion of the polymeric shell. For example, the polymeric shell of the core-shell particles can be at least partially formed from a chain extended polyurethane prepared from: (a) a first polyurethane prepolymer comprising a terminal isocyanate functional group, pendant carboxylic acid functional groups, and a terminal keto and/or aldo functional group; (b) a second polyurethane prepolymer comprising a terminal isocyanate functional group, pendant carboxylic acid functional groups, and a terminal ethylenically unsaturated group; and (c) a diamine that reacts with both the first and second polyurethane prepolymers. The ethylenically unsaturated monomers can then be polymerized in the presence of the polyurethane to form the polymeric core-shell particles in which the polymeric core is covalently bonded to at least a portion of the polymeric shell.

The polymeric core-shell particles are dispersed in the aqueous carrier medium of the coating composition according to the present invention. It is appreciated that any combination of core-shell particles described herein can be dispersed in an aqueous medium to form a latex. As used herein, a "latex", with respect to the core-shell particles, refers to an aqueous colloidal dispersion of the polymeric particles.

The core-shell particles can comprise at least 5 weight %, such as at least 10 weight %, or at least 15 weight % of the coating composition, based on the total solids weight of the coating composition of the present invention. The core-shell particles can comprise up to 40 weight %, such as up to 35 weight %, or up to 30 weight % of the coating composition according to the present invention, based on the total solids weight of the coating composition. For example, the coating composition of the present invention can comprise the core-shell particles in an amount of from 5 to 40 weight %, or from 10 to 35 weight %, or from 15 to 30 weight % of the coating composition, based on the total solids weight of the coating composition.

It was found that the addition of the core-shell particles to the coating composition of the present invention improves the elastomeric properties of the final cured coating while maintaining good barrier properties. For example, the addition of the core-shell particles improved the elongation at break of the final coating at low temperatures such as at −40° C. while maintaining good barrier properties.

The coating formed from the composition comprising the core-shell particles and the polymer(s) having barrier and elastomeric segments can have an oxygen permeance of 100 or less cc·mm/m$^2$·day·atm, 80 or less cc·mm/m$^2$·day·atm, 60 or less cc·mm/m$^2$·day·atm, 50 or less cc·mm/m$^2$·day·atm, or 40 or less cc·mm/m$^2$·day·atm at 23° C. and 50% relative humidity. The oxygen permeance is determined with an OX-TRAN® 1/50 test system (commercially available from Mocon Inc.) at 23° C. and 50% relative humidity in accordance with ASTM method F1927-14.

Further, the coating formed from the composition comprising the core-shell particles and the polymer(s) having barrier and elastomeric segments can have an elongation at break of at least 25% at −40° C., at least 50% at −40° C., at least 75% at −40° C., or at least 100% at −40° C. The elongation at break is determined with an INSTRON® model 4443 SFL unit with a temperature controlled test chamber (commercially available from Instron Corp.).

The coating composition, according to the present invention, can optionally include, besides the above-described first polymer and the polymeric core-shell particles, one or more additional polymer(s) including, but not limited to, elastomeric polymer(s) that can further increase elasticity of the final coating. Non-limiting examples of elastomeric polymers include polyesters, polyethers, polysulfides, natural rubbers, synthetic rubbers, copolymers thereof, or combinations thereof. Examples of suitable polyesters, polyethers, polysulfides and rubber based polymers include, but are not limited to, any of those previously described. Other non-limiting examples of elastomeric polymers are described in U.S. Pat. No. 8,716,402 at column 4, line 34 to column 5, line 2, which is incorporated by reference herein.

The elastomeric polymers can also be dispersed in an aqueous medium to form a separate dispersion before being combined with the other components of the coating composition. The polymer dispersion can then be combined with other components to form the coating composition of the present invention. The elastomeric polymer(s) can also be dispersed with the first polymer having barrier and elastomeric segments and then combined with other components to form the coating composition of the present invention.

When used in the coating composition of the present invention, the optional additional polymer(s) can comprise at least 5 weight %, such as at least 10 weight %, or at least 15% of the coating composition, based on the total solids weight of the coating composition. The optional additional polymer can comprise up to 40 weight %, such as up to 35 weight %, or up to 30 weight % of the coating composition, based on the total solids weight of the coating composition. The coating composition can, for example, comprise the optional additional polymer, when present, in an amount, from 5 to 40 weight %, such as from 10 to 35 weight %, or from 15 to 30 weight %, based on the total solids weight of the coating composition.

The polymers that form the coating composition can have functional groups that are reactive with each other or with themselves such that the polymers are self-crosslinking. The coating composition can, optionally, also include a crosslinker. As used herein, a "crosslinker" refers to a chemical species comprising two or more functional groups that are reactive with other functional groups and which is capable of linking two or more monomers or polymer molecules through covalent bonds. Non-limiting examples of crosslinkers that can be used with the compositions described herein include carbodiimides, polyhydrazides, aziridines, epoxy resins, alkylated carbamate resins, (meth)acrylates, isocyanates, blocked isocyanates, polyacids, polyamines, polyamides, aminoplasts, melamines, hydroxyalkyl ureas, hydroxyalkyl amides, and any combination thereof. It is appreciated that the coating composition can include a single type or multiple types of crosslinkers.

The crosslinkers used with the elastic barrier compositions described herein can be reactive with the polymer having barrier and elastomeric segments, the core-shell particles, the optional additional polymer(s) such as the elastomeric polymers, or any combination thereof. For example, the coating compositions of the present invention can comprise a crosslinker selected from a polyhydrazide, a carbodiimide, or a combination thereof that are reactive with the functional groups of the first polymer having barrier and elastomeric segments, the core-shell particles, the optional additional polymers, or any combination thereof. Non-limiting examples of suitable polyhydrazides include maleic dihydrazide, fumaric dihydrazide, itaconic dihydrazide, phthalic dihydrazide, isophthalic dihydrazide, terephthalic dihydrazide, trimellitic trihydrazide, oxalic dihydrazide, adipic acid dihydrazide, sebacic dihydrazide, and combinations thereof. Further, non-limiting examples of suitable polycarbodiimides are described in U.S. Patent No. 2011/0070374, which is incorporated by reference herein in its entirety.

In some examples, the coating composition comprises keto and/or aldo functional core-shell particles and a polyhydrazide crosslinker reactive with the keto and/or aldo functional groups. The coating composition can also comprise carboxylic acid functional core-shell particles and/or carboxylic acid functional polymers having barrier and elastomeric segments, and a polycarbodiimide crosslinker that is reactive with the carboxylic acid functional groups. As indicated, the coating composition can comprise two or more different crosslinkers that are reactive with different functional groups. Thus, the coating composition of the present invention can for example comprise a polyhydrazide crosslinker reactive with keto and/or aldo functional groups as well as a carbodiimide crosslinker reactive with carboxylic acid functional groups.

The coating composition can also comprise a first crosslinker(s) selected from a polyhydrazide, a carbodiimide, or a combination thereof, and a secondary crosslinker(s) that is different from the first crosslinker(s) and which can be used to help maintain the desired properties of the final coatings. For example, the secondary crosslinker(s) can be added to stop the softening of the final coating at high temperatures (e.g. above 100° C.). Non-limiting examples of suitable secondary crosslinker(s) include melamines, hydroxyalkyl ureas, hydroxyalkyl amides, blocked isocyanates, and combinations thereof. The secondary crosslinker(s) can be reactive with the polymer having barrier and elastomeric segments, the core-shell particles, the optional additional polymer(s), when used, or any combination thereof.

If used, the crosslinker(s) can comprise at least 0.5 weight %, such as at least 1 weight %, or at least 3 weight % of the coating composition, based on the total solids weight of the coating composition. The crosslinker(s) can comprise up to 10 weight % or up to 8 weight % of the coating composition, based on the total solids weight of the coating composition. The coating composition of the present invention can, for example, comprise the crosslinker(s) in a total amount of from 0.5 to 10 weight %, or from 1 to 8 weight %, or from 3 to 8 weight % of the coating composition, based on the total solids weight of the coating composition. If used, secondary crosslinker(s) as set forth above can be included in the coating composition of the present invention at a lower amount than the first crosslinker(s).

The coating compositions can also include a platy inorganic filler. As used herein, a "platy inorganic filler" refers to an inorganic material in a platy form. The term "platy" refers to a structure in which one dimension is substantially smaller than the two other dimensions of the structure resulting in a flat type appearance. The platy inorganic fillers are generally in the form of stacked lamellae, sheets, platelets, flakes, or plates with a relatively pronounced anisometry. The platy inorganic filler(s) can further improve the barrier performance of the resulting coating by reducing the permeability of liquids and gases.

Suitable platy inorganic fillers can include those having a high aspect ratio, such as for example, vermiculite, mica, talc, wollastonite, chlorite, metal flakes, platy clays, and platy silicas. Such fillers typically have diameters of 1 to 20 µm (microns), 2 to 5 µm (microns), or 2 to 10 µm (microns). The aspect ratio of the fillers can be at least 5:1, such as at least 10:1 or 20:1. For example, mica flakes may have an aspect ratio of 20:1 or more, talc may have an aspect ratio of 10:1 to 20:1, and vermiculite may have an aspect ratio of from 200:1 to 10,000:1.

The coating compositions of the present invention can optionally include other optional materials. For example, the coating compositions can also comprise a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes, and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures or combinations thereof. The terms "pigment" and "colored filler" can be used interchangeably.

Example dyes include, but are not limited to, those that are solvent and/or aqueous based such as phthalo green or blue, iron oxide, bismuth vanadate, and mixtures or combinations thereof.

Example tints include, but are not limited to, pigments dispersed in water-based or water-miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

Other non-limiting examples of optional materials that can be used with the coating compositions of the present invention include plasticizers, abrasion resistant particles, corrosion resistant particles, corrosion inhibiting additives, anti-oxidants, hindered amine light stabilizers, UV light absorbers and stabilizers, surfactants, flow and surface control agents, thixotropic agents, organic cosolvents, reactive diluents, catalysts, reaction inhibitors, and other customary auxiliaries.

The coating compositions of the present invention can be prepared by mixing a polymer having barrier and elastomeric segments as set forth above, core-shell particles as described above and, optionally, one or more crosslinker(s) and any of the other previously described components in an aqueous carrier medium. As previously described, the polymer having barrier and elastomeric segments, the core-shell particles, and the optional additional polymer(s), when used, can be formed as separate dispersions. As such, the previously described polymers and core-shell particles can first be prepared as separate dispersions and then combined along with the other optional components to form the coating composition. Alternatively, two or more of the previously described components can be dispersed together in the same aqueous medium before being combined with the remaining components of the coating composition. For example, keto and/or aldo functional core-shell particles can be dispersed in a first aqueous medium with a polyhydrazide prior to being combined with the remaining components of the coating composition. The polymer having barrier and elastomeric segments can also be dispersed in the same aqueous medium as the optional additional polymer(s), when used.

After forming the coating compositions of the present invention, the compositions can be applied to a wide range of substrates known in the coatings industry. For example, the coating compositions of the present invention can be at least partially applied to metallic or non-metallic substrates. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric substrates such as polyester, polyolefin, polyamide, cellulosic, polystyrene, polyacrylic, poly(ethylene naphthalate), polypropylene, polyethylene, nylon, EVOH, polylactic acid, and other "green" polymeric substrates, poly(ethyleneterephthalate) (PET), polycarbonate, polycarbonate acrylobutadiene styrene (PC/ABS), polyamide, wood, veneer, wood composite, particle board, medium density fiberboard, cement, stone, ceramic, glass, paper, cardboard, textiles, leather both synthetic and natural, and the like or combinations or composites of any of the foregoing.

Specific non-limiting examples of suitable substrates include athletic balls, such as soccer balls, basketballs, volleyballs, footballs, racquet balls, squash balls, beach balls, tennis balls, golf balls, baseballs, and the like; inflatable rafts, furniture, toys, and the like; air mattresses, air bags, air shocks, bladders, emergency slides, life vests, medical equipment and devices, such as blood pressure bags, catheters, and the like; tires, such as bike tires, automobile tires, bike tubes, ultra-terrain bike tires, motorcycle tires, lawn tractor tires, and the like; balloons, air bladders, or other footwear applications, packaging material, such as bottles, wraps, food, or plastic sheets, hoses, garbage bags, plastic light bulbs, fire extinguishers, LED displays, plasma TV's, parachutes, scuba tanks, gas cylinders, flexible foam, rigid foam, other pipes, hoses, tubes, and the like; architectural needs, such as windows, roofing, siding, and the like; fiber optic cables, seals and gaskets, batteries, clothing and other textiles, swimming pool liners and covers, hot tubs, tanks, electronics, buckets, and pails.

The coating compositions of the present invention are particularly useful when applied to elastomeric substrates that exhibit a degree of elasticity. Examples of such substrates include, but are not limited, thermoplastic urethane, synthetic leather, natural leather, finished natural leather, finished synthetic leather, ethylene vinyl acetate foam, polyolefins and polyolefin blends, polyvinyl acetate and copolymers, polyvinyl chloride and copolymers, urethane elastomers, synthetic textiles, natural textiles, rubbers, and combinations thereof. The substrates can also include those that have gas permeability such as substrates comprising polymers, including but not limited to, polyesters, polyolefins, polyamides, cellulosics, polystyrenes, polyacrylics, polycarbonates, poly(ethylene terephthalate), poly(ethylene naphthalate), and combinations thereof. It is appreciated that the substrates can include gas permeable elastomeric materials.

It was found that the coating compositions of the present invention can be applied to a substrate and cured to form elastic gas barrier coatings that provide both low temperature elasticity and good oxygen/nitrogen gas barrier performance. For example, coatings deposited from the coating compositions described herein have been found to exhibit an elasticity of at least 25% at temperatures as low as −40° C. The coatings also exhibit an elasticity of at least 100% at temperatures around room temperature (20° C. to 23° C.) and higher. In addition, the elastic gas barrier coatings also exhibit good oxygen permeance at temperatures from −40° C. to 100° C., such as an oxygen permeance of 71 cc·mm/m$^2$·day·atm at 23° C. and 50% relative humidity. The elasticity and oxygen permeance is determined as previously described.

To increase adhesion of a coating to a substrate, the substrate can be chemically and/or mechanically treated prior to applying a coating composition or film described herein. For instance, the surface of the substrate can be roughened, treated with steam, treated with a chemical solution, or heated prior to applying a coating composition or film. Any combination of these treatment methods can be used together to improve adhesion of a coating to the substrate.

The process of roughening the surface of a substrate can comprise abrading or scuffing the surface of the substrate such that the texture of the surface is adjusted to include increased or additional vertical deviations. The surface of the substrate can be roughened using various methods including, but not limited to, sandblasting, scrubbing with sandpaper, or a combination thereof. As used herein, "sandblasting" refers to a process of spraying sand, or fine particles of other materials such as gravel, over the surface of a substrate. Sandblasting can use compressed-air to spray the sand or other fine particulate materials at a pressure and speed sufficient to roughen the surface of the substrate.

As indicated, the surface of the substrate can also be treated with steam and/or a chemical solution. As used herein, "steam" refers to a vapor or mist formed from water, and a "chemical solution" refers to a liquid mixture of two or more substances. Non-limiting examples of chemical solutions that can be used to treat the surface of the substrate include solutions comprising chlorinated compounds. Examples of suitable chlorinated compounds include, but are not limited to, hypochlorite, trichloroisocyanuric acid, and combinations thereof. A commercially available chemical solution includes Clorox Clean-Up® from the Clorox Company. The steam and/or chemical solution can be applied to the surface of the substrate to remove contaminates and other objects.

Further, the substrate or the surface of the substrate that is to be coated can be heated to further increase adhesion of a coating. For example, the substrate or surface of the substrate can be heated to a temperature of 100° C. to 300° C., or from 120° C. to 280° C., or from 150° C. to 250° C. The substrate or surface of the substrate can be heated with convective heat, electromagnetic radiation such as infrared radiation, or a combination thereof "Convective heat" refers to a heat transfer in a gas, and "electromagnetic radiation" refers to radiant energy released by electromagnetic processes. Electromagnetic radiation includes radio waves, microwaves, infrared and near-infrared radiation, visible light, and ultraviolet radiation.

As noted above, the surface of a substrate can be treated with any combination of the previously described treatment methods. For instance, the surface of a substrate can be sandblasted, treated with steam and a hypochlorite chemical solution, and then heated to a temperature of 100° C. to 300° C. prior to applying a coating composition.

The coating compositions of the present invention can be applied to the substrate by various means known in the art including, but not limited to, spraying, dipping, brushing, rolling, and the like. After the coating compositions are applied to a substrate, the compositions can be dried and/or cured at ambient conditions, with heat, or with other means such as actinic radiation to form a coating. As used herein, the terms "curable", "cure", and the like mean that at least a portion of the resinous materials in a composition is crosslinked or crosslinkable. Further, "ambient conditions" refers to the conditions of the surrounding environment (e.g., the temperature, humidity, and pressure of the room or outdoor environment in which the substrate is located). The term "actinic radiation" refers to electromagnetic radiation that can initiate chemical reactions. Actinic radiation includes, but is not limited to, visible light, ultraviolet (UV) light, X-rays, and gamma radiation.

The coating composition of the present invention can also be at least partially applied to an elastomeric substrate and co-molded or covulcanized therewith. "Covulcanization" and like terms refer to the process of chemically producing crosslinks or bonds between the elastomeric materials in the coating composition and the substrate. When a crosslinker is used with the coating composition, it will be appreciated that two "crosslinking" mechanisms occur—one between the elastomeric materials in the coating composition and the substrate, and one between the functional groups on the polymeric materials and the crosslinker(s) used in the coating composition.

In addition, the coating composition can also be applied to a substrate as a dehydrated film and then formed into the final coating. For example, the coating composition of the present invention can be applied to a first substrate and then dried such that substantially all water in the coating composition is evaporated to thereby form an elastic barrier film. The first substrate can include any of those previously described provided that the dehydrated film does not form bonds with the substrate. The coating composition can also be applied to the first substrate using any technique known in the art such as spraying for example.

As indicated, substantially all water in the coating composition is removed after being applied to the first substrate. As used herein, "substantially all water" refers to at least 90% of all water in the coating composition. The water can be evaporated at ambient conditions or by applying heat. In some examples, substantially all water from the coating composition is evaporated by heating the coating composition at temperature of 25° C. to 150° C.

After forming an elastic barrier film by evaporating substantially all water from the coating composition, the film can be removed from the first substrate and applied to a second substrate. The second substrate can include any of the substrates previously described. The elastic barrier film may then be cured and/or further dried to form the final coating over the substrate. The film can be cured and/or dried by: (i) applying actinic radiation to the applied film; (ii) applying convective heat to the applied film; (iii) applying the elastic barrier film to the second substrate while the second substrate is heated above ambient temperatures; or a combination thereof.

Alternatively, the film is cured and/or dried by maintaining the film on the second substrate at ambient conditions for a time sufficient to allow the curing and/or drying of the elastic barrier film. As used herein, a "time sufficient", with respect to the curing and/or drying of the elastic barrier film, refers to a period of time necessary to remove any remaining solvents and form the final coating such as with a crosslinking process.

It was found that the formation and application of a preformed film provides a more continuous coating over the final substrate. The elastic barrier film also allows for easy storage, transportation, and application of the film prior to formation of the final coating.

The coating formed over the final substrate according to any of the methods previously described will typically have a dry film thickness of 2.54 µm to 2.03 mm (0.1 to 80 mils), such as 12.7 µm to 1.27 mm (0.5 to 50 mils) or 0.25 mm to 0.76 mm (10 to 30 mils).

The coating compositions described herein can be applied to a substrate to form a monocoat. As used herein, a "monocoat" refers to a single layer coating system that is free of additional coating layers. Thus, the coating composition can be applied directly to a substrate and dehydrated and/or cured to form a single layer coating, i.e. a monocoat.

Alternatively, the coating compositions of the present invention can be applied to a substrate along with one or more additional coating layer(s) to form a multi-layer coating. The multi-layer coating can comprise two or more coating layers that impart barrier properties (i.e., a vapor barrier, gas barrier, and/or chemical barrier), elastomeric properties (i.e., elasticity), or a combination thereof. For instance, the multi-layer coating can comprise at least a first coating layer that provides barrier and elastomeric properties, and at least a second coating layer that provides gas barrier properties, which are greater than that of the first coating layer. The first coating layer can be applied over at least a portion of a substrate and the second coating layer can be applied over at least a portion of the first coating layer. Alternatively, the second coating layer can be applied over at least a portion of a substrate and the first coating layer can be applied over at least a portion of the second coating layer.

The multi-layer coating can also comprise additional coating layers such as a third coating layer that independently provides barrier and elastomeric properties and which is the same or different than the first coating layer that also provides barrier and elastomeric properties. The second coating layer that provides barrier properties is typically positioned between the first and third coating layers.

The first and third coating layers that provide barrier and elastomeric properties can be formed from a coating composition that comprises: (1) a polymer comprising barrier and elastomeric segments and aqueous dispersed core-shell particles such as previously described; (2) a polysulfide and a second polymer having an oxygen permeance of 40 or less, such as 20 or less, or 10 or less, cc·mm/m$^2$·day·atm at 23° C. and 50% relative humidity; or (3) a combination thereof. The polysulfide, the polymer comprising barrier and elastomeric segments, and the aqueous dispersed core-shell particles can include, but are not limited to, the polysulfides, polymers having barrier and elastomeric segments, and aqueous dispersed core-shell particles previously described.

Non-limiting examples of polymers having an oxygen permeance of 40 or less, such as 20 or less, or 10 or less, cc·mm/m$^2$·day·atm at 23° C. and 50% relative humidity include, but are not limited to, polyurethanes, polyvinylidene chloride polymers, polyureas, or combinations thereof. Examples of compositions that include polysulfides and polyurethanes and/or polyvinylidene chloride polymers are described in U.S. Patent Application Publication No. 2015/0368512 at paragraphs [0017] to and the corresponding examples, which is incorporated by reference herein. It is appreciated that the polymer having an oxygen permeance of 40 or less, such as 20 or less, or 10 or less, cc·mm/m$^2$·day·atm at 23° C. and 50% relative humidity can include the polymers having barrier and elastomeric segments previously described.

Further, the second coating layer that provides barrier properties, such as an oxygen permeance, that are greater than that of the first and third coating layers can be formed from a coating composition comprising a (i) polymer having an oxygen permeance of 40 or less, such as 20 or less, or 10 or less, cc·mm/m$^2$·day·atm at 23° C. and 50% relative humidity, and/or (ii) inorganic platy fillers dispersed in an aqueous medium. It is appreciated that a lower oxygen permeance number of cc·mm/m$^2$·day·atm at 23° C. and 50% relative humidity provides greater gas barrier properties. Further, the polymer having an oxygen permeance of 40 or less, such as 20 or less, or 10 or less, cc·mm/m$^2$·day·atm at 23° C. and 50% relative humidity that can be used to form the second coating layer can also have an elongation at break of less than 10% at −40° C.

Non-limiting examples of polymers having an elongation at break of less than 10% at −40° C. and an oxygen permeance of 40 or less, such as 20 or less, or 10 or less, cc·mm/m$^2$·day·atm at 23° C. and 50% relative humidity include polyurethanes, polyvinylidene chloride polymers, polyureas, or a combination thereof as previously described. For example, the polymer can include a polyurethane polymers having barrier and elastomeric segments previously described provided that the barrier segments have an elongation at break of less than 10% at −40° C. and an oxygen permeance of 40 or less, such as 20 or less, or 10 or less, cc·mm/m²·day·atm at 23° C. and 50% relative humidity.

The coating compositions that form the coating layers of the multi-layer coating can also comprise additional components including, but are not limited to, crosslinkers, pigments, and any of the other materials previously described. For instance, the coating compositions that form the coating layer(s) that provides elastomeric and barrier properties can include, but are not limited to, a polymer comprising barrier and elastomeric segments, aqueous dispersed core-shell particles, and one or more crosslinkers.

Each of the coating compositions that form the various layers of the multi-layer coating can be applied as a wet-on-wet process. Alternatively, one or more of the coating compositions can be subjected to a curing and/or drying step after being deposited. In some examples, all of the coating compositions that form the various layers of the multi-layer coating are subjected to a curing and/or drying step after being deposited.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" polymer, "a" crosslinker, "a" core-shell particle, and the like refer to one or more of any of these items.

The following examples are presented to demonstrate the general principles of the invention. The invention should not be considered as limited to the specific examples presented. All parts and percentages in the examples are by weight unless otherwise indicated.

Example 1

Preparation of a Polyester Prepolymer

A polyester prepolymer was prepared from the components listed in Table 1.

TABLE 1

| Component | Amount (grams) |
|---|---|
| Diethylene glycol | 3500.0 |
| Succinic anhydride | 4176.0 |
| Dibutyltin oxide | 15.0 |

The components listed in Table 1 were charged in a four-neck round bottom flask equipped with an electronic temperature probe, mechanical stirrer, condenser, dry nitrogen sparge, and a heating mantle. The temperature was gradually increased to 210° C. over a four hour period while stirring, sparging with nitrogen, and collecting the distillate. The reaction temperature was then held at 210° C. for 20 hours until the acid value dropped to 10.6 and 561 ml of distillate was collected. The final product was a dark orange liquid with a Gardner-Holdt viscosity of Z6+, an acid value of 10.6, a number average molecular weight (MN) of 1734 g/mol, a weight average molecular weight (MW) of 3394 g/mol, and a nonvolatile content of 98.5% (measured at 110° C. for one hour). The weight average molecular weight and number average molecular weight was determined by gel permeation chromatography versus a polystyrene standard with tetrahydrofuran as the mobile phase. The acid value was measured by titration with 1N KOH solution.

Example 2

Preparation of a Polyester Polyurethane Dispersion

A polyester polyurethane dispersion was prepared from the components listed in Table 2.

TABLE 2

| Component | Amount (grams) |
|---|---|
| Charge A | |
| Polyester prepolymer of Example 1 | 908.6 |
| Dimethylolpropionic acid | 146.0 |
| Methyl ethyl ketone | 1417.5 |
| 1,3-bis(2-hydroxyethoxy) benzene | 421.2 |
| Charge B | |
| Toluene diisocyanate | 733.3 |
| Charge C | |
| Methyl ethyl ketone | 73.3 |
| Charge D | |
| Water | 3754.9 |
| Dimethylethanolamine | 78.6 |
| Meta-xylene diamine | 24.3 |

Charge A was added to a four-neck round bottom flask equipped with an electronic temperature probe, mechanical stirrer, condenser, nitrogen atmosphere, and a heating mantle. Charge A was stirred at 78° C. for 30 minutes then cooled to 35° C. Charge B was then added over 10 minutes. Charge C was used to rinse the addition funnel used for B. The mixture was held at 78° C. for two hours.

Charge D was heated in a separate 12 liter four-neck flask under a nitrogen atmosphere to 60° C. About 3330.0 g of the reaction product of charges A, B, and C was added to charge D over a 12 minute period. The methyl ethyl ketone was then removed by vacuum distillation at 50° C. The final dispersion had a Brookfield viscosity of 330 centipoise (spindle #3, 60 RPM), an acid value of 11.4, a pH of 7.12, and a nonvolatile content of 40.3% (measured at 110° C. for one hour). The acid value was measured by titration with 1N KOH solution.

Example 3

Preparation of a Polyester Polyurethane Dispersion

A polyester polyurethane dispersion was prepared from the components listed in Table 3.

TABLE 3

| Component | Amount (grams) |
|---|---|
| Charge A | |
| Polyester prepolymer of Example 1 | 258.8 |
| Dimethylolpropionic acid | 41.6 |
| Methyl ethyl ketone | 437.5 |
| 1,3-bis(2-hydroxyethoxy) benzene | 120.0 |
| Charge B | |
| Toluene diisocyanate | 231.0 |
| Charge C | |
| Methyl ethyl ketone | 23.1 |
| Charge D | |
| Water | 413.6 |
| Dimethylethanolamine | 22.4 |
| Ethylenediamine | 9.6 |
| Diacetone acrylamide | 25.8 |

Charge A was added to a four-neck round bottom flask equipped with an electronic temperature probe, mechanical stirrer, condenser, nitrogen atmosphere, and a heating mantle. Charge A was stirred at 78° C. for 30 minutes then cooled to 35° C. Charge B was then added over 10 minutes. Charge C was used to rinse the addition funnel used for B. The mixture was held at 78° C. for two hours.

Charge D was heated in a separate 12 liter four-neck flask under a nitrogen atmosphere to 60° C. About 1000.9 g of the reaction product of charges A, B, and C was added to charge D over a 12 minute period. The methyl ethyl ketone was then removed by vacuum distillation at 50° C. The final dispersion had a Brookfield viscosity of 3060 centipoise (spindle #5, 60 RPM), an acid value of 12.0, a pH of 7.86, and a nonvolatile content of 46.3% (measured at 110° C. for one hour). The acid value was measured by titration with 1N KOH solution.

Example 4

Preparation of a Polyether Polyurethane Dispersion

A polyether polyurethane dispersion was prepared from the components listed in Table 4.

TABLE 4

| Component | Amount (grams) |
|---|---|
| Charge A | |
| Polytetrahydrofuran (MW of 1,000 g/mol) | 334.0 |
| Dimethylolpropionic acid | 49.9 |
| Methyl ethyl ketone | 332.4 |
| 1,3-bis(2-hydroxyethoxy) benzene | 157.5 |
| Charge B | |
| Toluene diisocyanate | 295 |
| Charge C | |
| Methyl ethyl ketone | 29.5 |
| Charge D | |
| Water | 1339.0 |
| Dimethylethanolamine | 26.9 |
| Ethylenediamine | 6.9 |

Charge A was added to a four-neck round bottom flask equipped with an electronic temperature probe, mechanical stirrer, condenser, nitrogen atmosphere, and a heating mantle. Charge A was stirred at 78° C. for 30 minutes then cooled to 35° C. Charge B was then added over 10 minutes. Charge C was used to rinse the addition funnel used for B. The mixture was held at 78° C. for two hours.

Charge D was heated in a separate 12 liter four-neck flask under a nitrogen atmosphere to 60° C. About 1078.8 g of the reaction product of charges A, B, and C was added to charge D over a 12 minute period. The methyl ethyl ketone was then removed by vacuum distillation at 50° C. The final dispersion had a Brookfield viscosity of 180 centipoise (spindle #2, 60 RPM), an acid value of 10.3, a pH of 7.65, and a nonvolatile content of 39.9% (measured at 110° C. for one hour). The acid value was measured by titration with 1N KOH solution.

Example 5

Preparation of a Polyether Polyurethane Dispersion

A polyether polyurethane dispersion was prepared from the components listed in Table 5.

TABLE 5

| Component | Amount (grams) |
|---|---|
| Charge A | |
| Polytetrahydrofuran (MW of 1,000 g/mol) | 1161.5 |
| Dimethylolpropionic acid | 173.5 |
| Methyl ethyl ketone | 1153.0 |
| 1,3-bis(2-hydroxyethoxy) benzene | 547.9 |
| Charge B | |
| Toluene diisocyanate | 1027.4 |
| Charge C | |
| Methyl ethyl ketone | 102.7 |
| Charge D | |
| Water | 4930.7 |
| Dimethylethanolamine | 98.6 |
| Ethylenediamine | 25.3 |
| FOAMASTER ® MO 2111 [1] | 6.98 |
| Charge E | |
| PROXEL ™ GXL preservative [2] | 7.75 |

[1] Defoamer, commercially available from BASF Corporation.
[2] Microbiocide formed from an aqueous solution of 1,2-benzisothiazolin-3-one, commercially available from Lonza.

Charge A was added to a four-neck round bottom flask equipped with an electronic temperature probe, mechanical stirrer, condenser, nitrogen atmosphere, and a heating mantle. Charge A was stirred at 78° C. for 30 minutes then cooled to 35° C. Charge B was then added over 10 minutes. Charge C was used to rinse the addition funnel used for B. The mixture was held at 78° C. for two hours.

Charge D was heated in a separate 12 liter four-neck flask under a nitrogen atmosphere to 60° C. About 3957.7 g of the reaction product of charges A, B, and C was added to charge D over a 12 minute period. Charge E was then added and the methyl ethyl ketone was then removed by vacuum distillation at 50° C. The final dispersion had a Brookfield viscosity of 225 centipoise (spindle #2, 60 RPM), an acid value of 10.1, a pH of 7.71, and a nonvolatile content of 41.7% (measured at 110° C. for one hour). The acid value was measured by titration with 1N KOH solution.

Further, the glass transition temperature ($T_g$) of the barrier segment is 62° C. and the $T_g$ of the elastomeric segment is −84° C. The $T_g$ is determined by dynamic mechanical analysis using a model QA800 Dynamic Mechanical Analysis made by TA Instruments (New Castle, Del.) using the following parameters: mode: tension film, amplitude: 20 μm, frequency: 1 Hz, clamping force: 15 cNm, temperature cycle: −100° C. to 175° C., heating rate: 3° C./min., sample dimensions: 15.0 length x~6.5 width (mm).

Example 6

Preparation of a Latex

Part A: A polyurethane was first prepared from the components listed in Table 6.

TABLE 6

| Component | Amount (grams) |
|---|---|
| Charge A | |
| 2-ethylhexyl acrylate | 533 |
| FOMREZ ® 66-56 [3] | 857 |
| 2,6-di-tert-butyl 4-methyl phenol | 3.1 |
| Hydroxyethyl methacrylate | 410 |
| Dimethylol propionic acid | 155.3 |
| Triethyl amine | 6.2 |
| Charge B | |
| Isophorone diisocyanate | 646.9 |
| Charge C | |
| 2-ethylhexyl acrylate | 38.5 |
| Dibutyl tin dilaurate | 1.6 |
| Charge D | |
| 2-ethylhexyl acrylate | 533 |
| Hexanediol diacrylate | 93.2 |

[3] Hydroxyl terminated saturated linear polyester polyol, commercially available from Chemtura.

Charge A was added to a four-neck round bottom flask equipped with a thermocouple, mechanical stirrer, and condenser. Charge A was heated to 50° C. and held for 15 minutes. Charge B was added over 10 minutes and mixed for 15 minutes. Charge C was added and immediate exotherm was observed. After exotherm subsided, the mixture was heated to 90° C., and held for 60 minutes. The isocyanate equivalent weight was measured to be 1108. The mixture was cooled to 70° C., and Charge D was added. The mixture was kept at 60° C. before being dispersed into water.

Part B: A latex comprising core-shell particles with keto and carboxylic acid functionality was prepared from the components listed in Table 7.

TABLE 7

| Component | Amount (grams) |
|---|---|
| Charge A | |
| DI water | 2352.2 |
| Diacetone acrylamide | 147 |
| Dimethylethanolamine | 105.3 |
| Ethylenediamine | 54.7 |
| Charge B | |
| DI water | 2058 |
| Charge C | |
| Polyurethane of Part A | 2831 |
| Charge D | |
| Ammonium persulfate | 8.2 |
| DI water | 353 |
| Charge E | |
| FOAMKILL ® 649 [4] | 1.2 |
| ACTICIDE ® MBS [5] | 25 |
| DI water | 58 |

[4] A non-silicone defoamer, commercially available from Crucible Chemical Company.
[5] Microbiocide formed of a mixture of 1,2-benzisothiazolin-3-one and 2-methyl-4-isothiazolin-3-one, commercially available from Thor GmbH.

Charge A was added to a four-neck round bottom flask equipped with a thermocouple, mechanical stirrer, and condenser. Charge A was heated to 70° C. and held for two hours with an $N_2$ blanket. Charge B was added and held at 50° C. for 15 minutes. Charge C was then dispersed into the flask over 20 minutes and mixed for an additional 15 minutes. Charge D was added over 15 minutes. The temperature rose from 50° C. to 71° C. due to polymerization exotherm. The mixture was held at 75° C. for an additional one hour. After being cooled to 40° C., Charge E was added and mixed for an additional 15 minutes. The resulting latex was filtered via a 10 μm bag. The latex had a solid content of 38.1%.

Example 7

Preparation of a Latex

Part A: A polyurethane was first prepared from the components listed in Table 8.

TABLE 8

| Component | Amount (grams) |
|---|---|
| Charge A | |
| 2-ethylhexyl acrylate | 494.4 |
| FOMREZ ® 66-56 [3] | 795 |
| 2,6-di-tert-butyl 4-methyl phenol | 2.9 |
| Hydroxyethyl methacrylate | 38 |
| Dimethylol propionic acid | 120 |
| Triethyl amine | 5.8 |
| Charge B | |
| Isophorone diisocyanate | 552 |
| Charge C | |
| 2-ethylhexyl acrylate | 35.7 |
| Dibutyl tin dilaurate | 1.5 |

TABLE 8-continued

| Component | Amount (grams) |
|---|---|
| Charge D | |
| 2-ethylhexyl acrylate | 494 |
| Hexanediol diacrylate | 86.4 |

Charge A was added to a four-neck round bottom flask equipped with a thermocouple, mechanical stirrer, and condenser. Charge A was heated to 50° C. and held for 15 minutes. Charge B was added over 10 minutes and mixed for 15 minutes. Charge C was added and immediate exotherm was observed. After exotherm subsided, the mixture was heated to 90° C., and held for 60 minutes. The isocyanate equivalent weight was measured to be 1132. The mixture was cooled to 70° C., and Charge D was added. The mixture was kept at 60° C. before being dispersed into water.

Part B: A latex comprising core-shell particles with carboxylic acid functionality was prepared from the components listed in Table 9.

TABLE 9

| Component | Amount (grams) |
|---|---|
| Charge A | |
| DI water | 3750 |
| Dimethylethanolamine | 80 |
| Ethylenediamine | 52.5 |
| Charge B | |
| Polyurethane of Part A | 2500 |
| Charge C | |
| Ammonium persulfate | 7.0 |
| DI water | 150 |
| Charge D | |
| FOAMKILL ® 649 [4] | 1.2 |
| ACTICIDE ® MBS [5] | 21 |
| DI water | 50 |

Charge A was added to a four-neck round bottom flask equipped with a thermocouple, mechanical stirrer, and condenser. Charge A was heated to 50° C. and held for two hours with an $N_2$ blanket. Charge B was then dispersed into the flask over 20 minutes and mixed for an additional 15 minutes. Charge C was added over 15 minutes. The temperature rose from 50° C. to 71° C. due to polymerization exotherm. The mixture was held at 75° C. for an additional one hour. After being cooled to 40° C., Charge D was added and mixed for an additional 15 minutes. The resulting latex was filtered via a 10 μm bag. The latex had a solid content of 38.8%.

Example 8

Preparation of a Latex

Part A: A polyurethane was first prepared from the components listed in Table 10.

TABLE 10

| Component | Amount (grams) |
|---|---|
| Charge A | |
| 2-ethylhexyl acrylate | 609 |
| FOMREZ ® 66-56 [3] | 979 |
| 2,6-di-tert-butyl 4-methyl phenol | 3.5 |
| Hydroxyethyl methacrylate | 46.8 |
| Dimethyol propionic acid | 148 |
| Triethyl amine | 7.1 |
| Charge B | |
| Isophorone diisocyanate | 680 |
| Charge C | |
| 2-ethylhexyl acrylate | 44 |
| Dibutyl tin dilaurate | 1.8 |
| Charge D | |
| 2-ethylhexyl acrylate | 609 |
| Hexanediol diacrylate | 106.4 |

Charge A was added to a four-neck round bottom flask equipped with a thermocouple, mechanical stirrer, and condenser. Charge A was heated to 50° C. and held for 15 minutes. Charge B was added over 10 minutes and mixed for 15 minutes. Charge C was added and immediate exotherm was observed. After exotherm subsided, the mixture was heated to 90° C., and held for 60 minutes. The isocyanate equivalent weight was measured to be 1000. The mixture was cooled to 70° C., and Charge D was added. The mixture was kept at 60° C. before being dispersed into water.

Part B: A latex comprising core-shell particles with carboxylic acid functionality was prepared from the components listed in Table 11.

TABLE 11

| Component | Amount (grams) |
|---|---|
| Charge A | |
| DI water | 4600 |
| Dimethylethanolamine | 91.2 |
| AEROSOL ® OT-75 [6] | 36.0 |
| Ethylenediamine | 70.1 |
| Charge B | |
| Polyurethane of Part A | 3000 |
| Charge C | |
| Ammonium persulfate | 9.0 |
| DI water | 180 |
| Charge D | |
| FOAMKILL ® 649 [4] | 1.2 |
| ACTICIDE ® MBS [5] | 25 |
| DI water | 60 |

[6] A surfactant of sodium dioctyl sulfosuccinate, commercially available from Cytec.

Charge A was added to a four-neck round bottom flask equipped with a thermocouple, mechanical stirrer, and condenser. Charge A was heated to 50° C. and held for two hours with an $N_2$ blanket. Charge B was then dispersed into the flask over 20 minutes and mixed for an additional 15 minutes. Charge C was added over 15 minutes. The temperature rose from 50° C. to 71° C. due to polymerization exotherm. The mixture was held at 75° C. for an additional one hour. After being cooled to 40° C., Charge D was added and mixed for an additional 15 minutes. The resulting latex was filtered via a 10 μm bag. The latex had a solid content of 39.2%.

Example 9

Preparation of Polyester

A polyester was prepared according to Example A1 of EP 1,454,971 B1 as follows: In a reactor equipped with a stirrer, a water separator and a control unit for the temperature, the following components were mixed and heated to 185° C.: 1732 grams of TERATHANE® (polytetramethylene ether glycol having a number average molecular weight of 650 g/mol, commercially available from DuPont), and 307 grams of trimellitic anhydride. Upon reaching a carboxyl group content of 0.713 mmol/g (acid number=40 mg KOH/g), the reaction temperature is lowered to 175° C. The reaction is continued until reaching a carboxyl group content of 0.535 mmol/g (acid number=30 mg KOH/g). The Gardner-Holdt viscosity of the resin solution at 60% strength in butoxyethanol was V. After cooling, the polyester melt to 85° C., 552 grams of a 10% aqueous dimethylethanolamine solution was added followed by 2390 grams of deionized water. A finely divided dispersion was formed having a nonvolatile content of 40% and an acid number of 29 mg KOH/g.

Examples 10-15

Preparation of Coating Compositions

Several coating compositions were prepared with the polymers and/or latexes previously described as shown in Table 12.

TABLE 12

| Example | Polyurethane[7] | Latex[8] | Polyester[9] | CARBODILITE ®[10] | FOAMASTER [1] |
|---|---|---|---|---|---|
| 10 | 98% | 0 | 0 | 0 | 2% |
| 11 | 0 | 98% | 0 | 0 | 2% |
| 12 | 29% | 64% | 0 | 0 | 7% |
| 13 | 0 | 0 | 100% | 0 | 0 |
| 14 | 60% | 24% | 15% | 0 | 0 |
| 15 | 59% | 24% | 15% | 2% | 0 |

[7] Polyurethane prepared according to Example 4.
[8] A mixture comprising 98.1% of the latex prepared according to Example 6 and 1.9 weight % of adipic acid dihydrazide.
[9] Polyester prepared according to Example 9.
[10] Waterborne carbodiimide crosslinker, commercially available from Nisshinbo Chemical, Inc. under the trade name CARBODILITE ® V-02-L2.

The compositions of Examples 10-15 were prepared by combining the components listed in Table 12 in an appropriate sized container for 15 minutes. Each mixture was then allowed to stand overnight (about 12 to 16 hours).

Examples 16

Evaluation of Elasticity and Oxygen Permeance

The coating compositions of Examples 10-15 were drawn down, using a K Control Coater from RK Printcoat Instruments Ltd. (Litlington, Royston, Hertfordshire, United Kingdom), onto polypropylene sheets. The coating compositions were then dried to form a dry film thickness of 0.13 mm to 0.76 mm (5 to 30 mils). After drying, the compositions were cured at ambient conditions for 10 minutes, at 49° C. (120° F.) for 10 minutes, and at 82° C. (180° F.) for 30 minutes. The resulting films were removed from the polypropylene sheet and tested for elasticity and oxygen permeance.

The elongation at break and oxygen permeance of each film is listed in Table 13.

TABLE 13

| Coating Example | Oxygen Permeance [11] | Elongation at Break [12] |
|---|---|---|
| 10 | 35.5 | 3.0% |
| 11 | 143.2 | 17% |
| 12 | 64.3 | 40% |
| 13 | Not a film | Not a film |
| 14 | 131.9 | 99% |
| 15 | 72.9 | 4.7% |

[11] Oxygen permeance reported in units of cc · mm/m$^2$ · day · atm at 23° C. and 50% relative humidity and determined with an OX-TRAN ® 1/50 test system (commercially available from Mocon Inc.) in accordance with ASTM method F1927-14.
[12] Elongation at break is reported as the amount of elongation in percentage a coating can withstand prior to breaking or cracking at −40° C. as determined with an INSTRON ® model 4443 SFL unit (commercially available from Instron Corp.) at a strain rate of 50 mm/minute.

As shown in Table 13, the coating of Example 12 exhibited the best combination of elastic and barrier properties.

Example 17

Preparation and Evaluation of Coating Compositions

Part A: A coating composition was first prepared with the components listed in Table 14.

TABLE 14

| Component | Solids Weight [13] | Solution Weight [14] |
|---|---|---|
| Polyurethane of Example 2 | 46.5 | 119.0 |
| Latex of Example 6 | 31.9 | 87.3 |

TABLE 14-continued

| Component | Solids Weight [13] | Solution Weight [14] |
|---|---|---|
| Adipic acid dihydrazide | 0.6 | 0.6 |
| BYK ®-032 [15] | 0.5 | 1.0 |
| CARBODILITE ® [10] | 4.9 | 12.5 |
| Polyester of Example 9 | 15.2 | 43.9 |
| BYK ®-425 [16] | 0.3 | 1.3 |

[13] Solids weight refers to the weight in grams of each dry component in the composition after all the water has been removed by evaporation and/or heating.
[14] Solution weight refers to the weight in grams of each component added to the composition prior to any evaporation.
[15] Emulsion of paraffin-based mineral oils and hydrophobic components, commercially available from BYK.
[16] Rheological additive comprising a solution of a urea modified polyurethane, commercially available from BYK ®.

The coating composition was prepared by weighing the polyurethane to an appropriate sized container and then adding adipic acid dihydrazide while stirring. Once adipic acid dihydrazide was added, stirring was continued for 15 minutes. Next, the following components were added in order while stirring: latex, polyester, CARBODILITE®, BYK®-032, and BYK®-425. The components were then mixed for 15 minutes and allowed to stand overnight (about 12-16 hours). After standing overnight, the mixture was stirred for an additional 15 minutes.

Part B: The coating composition of Part A was applied to a polypropylene sheet, dried, cured, and tested according to Examples 10-15. The resulting film exhibited an oxygen permeance of 71 cc·mm/m²·day·atm at 23° C. and 50% relative humidity. The resulting film also exhibited an elongation at break at −40° C. of 101%.

Example 18

Preparation and Evaluation of Coating Compositions

Part A: A coating composition was first prepared with the components listed in Table 15.

TABLE 15

| Component | Solids Weight [13] | Solution Weight [14] |
|---|---|---|
| Polyurethane of Example 4 | 57.2 | 145.6 |
| Latex of Example 6 | 23.1 | 63.9 |
| FOAMASTER ® 111 [17] | 0.5 | 0.5 |
| Polyester of Example 9 | 14.6 | 43.9 |
| CARBODILITE ® [10] | 4.7 | 12.5 |
| DI water | 0.0 | 10.0 |

[17] Non-ionic broad spectrum defoamer, commercially available from BASF.

The compositions was prepared by combining the components listed in Table 15 in an appropriate sized container for 15 minutes. The mixture was then allowed to stand overnight (about 12 to 16 hours).

Part B: The coating composition of Part A was applied to a polypropylene sheet, dried, cured, and tested according to Examples 10-15. The resulting film exhibited an oxygen permeance of 49 cc·mm/m²·day·atm, and an elongation at break at −40° C. of 112%.

Example 19

Preparation and Evaluation of Coating Compositions

Part A: A coating composition was first prepared with the components listed in Table 16.

TABLE 16

| Component | Solids Weight [13] | Solution Weight [14] |
|---|---|---|
| Polyurethane of Example 4 | 70.5 | 189.1 |
| Latex of Example 7 | 15.0 | 38.7 |
| FOAMASTER ® 111 [17] | 0.5 | 0.5 |
| Polyester of Example 9 | 9.9 | 28.6 |
| Carbon black dispersion in water | 1.9 | 5.2 |
| CARBODILITE ® [10] | 3.0 | 7.5 |
| DI water | 0.0 | 10.0 |

The compositions was prepared by combining the components listed in Table 16 in an appropriate sized container for 15 minutes. The mixture was then allowed to stand overnight (about 12 to 16 hours).

Part B: The coating composition of Part A was applied to ply rubber sheet with a sample width of at least 50 mm glued to a stiff, flat metal panel. The composition was then dried and cured for 10 minutes at ambient conditions, 10 minutes at 49° C. (120° F.) and 30 minutes at 82° C. (180° F.) and tested according to Examples 10-15. The resulting film exhibited an oxygen permeance of 62 cc·mm/m²·day·atm at 23° C. and 50% relative humidity. The resulting film also exhibited an elongation at break at −40° C. of 125%.

The coating composition prepared in Part A was also spray applied over two-ply rubber sheets glued to metal panels. Prior to coating the rubber sheets, the sheets were gently scuffed with sandpaper, washed, and scrubbed with Clorox Clean-Up® (Clorox Company, Oakland Calif.) using a plastic-bristled brush, rinsed with water, and allowed to dry. The compositions were then cured for 10 minutes at ambient conditions, 10 minutes at 49° C. (120° F.), and 30 minutes at 82° C. (180° F.). The resulting film on the first rubber sheet was subjected to a 180° peel test using an Instron model Mini 44 (Norwood, Mass.) at a strain rate of 50 mm/min. The resulting film on the second rubber sheet was cured for an additional 20 hours at 60° C. (140° F.) and then subjected to the 180° peel test. The first rubber sheet exhibited a peel strength of 3.46 N/mm and the second rubber sheet exhibited a peel strength of 4.30 N/mm.

Example 20

Preparation and Evaluation of Coating Compositions

Part A: A coating composition was first prepared with the components listed in Table 17.

TABLE 17

| Component | Solids Weight [13] | Solution Weight [14] |
|---|---|---|
| Polyurethane of Example 4 | 52.2 | 123.4 |
| Polyurethane of Example 3 | 4.7 | 11.8 |
| Latex of Example 6 | 23.0 | 63.9 |
| Adipic acid dihydrazide | 0.4 | 0.5 |
| FOAMASTER ® 111 [17] | 0.5 | 0.5 |
| Polyester of Example 9 | 14.5 | 43.9 |
| CARBODILITE ® [10] | 4.7 | 12.5 |
| DI water | 0 | 37.0 |

The coating composition was prepared by weighing the polyurethanes in an appropriate sized container and then adding adipic acid dihydrazide while stirring. Once adipic acid dihydrazide was added, stirring was continued for 15 minutes. The remaining components were added and mixed for 15 minutes. The resulting mixture was allowed to stand overnight (about 12-16 hours). After standing overnight, the mixture was stirred for an additional 15 minutes.

Part B: The coating composition of Part A was spray applied over two polypropylene sheets. The composition applied over the first polypropylene sheet was allowed to stand at ambient temperatures for several hours, and the composition applied over the second polypropylene sheet was cured for 10 minutes at ambient conditions, 10 minutes at 49° C. (120° F.) and 30 minutes at 82° C. (180° F.). The resulting films were then tested according to Examples 10-15. The first film exhibited an oxygen permeance of 91.7 cc·mm/m²·day·atm at 23° C. and 50% relative humidity, and an elongation at break at −40° C. of 38%. The second film cured at elevated temperatures exhibited an oxygen permeance of 87.8 cc·mm/m²·day·atm at 23° C. and 50% relative humidity, and an elongation at break at −40° C. of 95%.

Example 21

Preparation and Evaluation of Coating Compositions

Part A: A coating composition was first prepared according to Part A of Example 20 previously described.

Part B: The coating composition of Part A was spray applied over TEDLAR® sheets (polyvinyl fluoride film, commercially available from DuPont) and then cured for 10 minutes at ambient conditions, 10 minutes at 49° C. (120° F.), and 30 minutes at 82° C. (180° F.). The resulting films were then tested according to Examples 10-15. The free film exhibited an oxygen permeance of 67 cc·mm/m$^2$·day·atm at 23° C. and 50% relative humidity as well as an elongation at break at −40° C. of 101% and an elongation to break at room temperature of 287%.

Part C: The coating composition of Part A was again spray applied over TEDLAR® sheets and cured for 10 minutes at ambient conditions, 10 minutes at 49° C. (120° F.), and 30 minutes at 82° C. (180° F.). The resulting films, which had a film thickness of 0.18 mm (7 mils), were removed from the TEDLAR® sheets and applied over a general purpose body ply rubber that had not been vulcanized. The coated rubber was then heated at 160° C. for 10 minutes at a pressure of 347 psig. Upon further evaluation, it was discovered that the elastic film was sufficiently bonded to the vulcanized rubber.

Example 22

Preparation and Evaluation of a Multi-Layer Coating

Part A: A coating composition was first prepared with the components listed in Table 18.

TABLE 18

| Component | Solution Weight [14] |
|---|---|
| Polyurethane of Example 5 | 172.57 |
| FOAMASTER® 111 [17] | 0.50 |
| Latex of Example 8 | 38.27 |
| Polyester of Example 9 | 28.57 |
| CARBODILITE® [10] | 7.50 |
| Chlorinated polyolefin (CPO) | 33.33 |
| BYK® 348 [18] | 0.50 |
| Carbon black dispersion in water | 5.19 |

[18] A polyether modified siloxane, commercially available from BYK.

The coating composition was prepared by weighing the polyurethane in an appropriate sized container and then adding FOAMASTER® 111 while stirring. The remaining components, except the CPO, were added and mixed for 10 to 15 minutes. The resulting mixture was allowed to stand overnight (about 12-16 hours). After standing overnight, the mixture was stirred for an additional for 10 to 15 minutes while adding the CPO.

Part B: After preparing the coating composition, a sheet of rubber was scuffed with sandpaper, washed, and scrubbed with Clorox Clean-Up® (Clorox Company, Oakland Calif.) using a plastic-bristled brush, rinsed with water, and allowed to dry. The rubber sheet was then cut into several 5.1 cm×15.2 cm (2"×6") strips. The coating composition, and in some cases an aqueous dispersion comprising inorganic platy materials, were then applied using a draw down bar to some of the rubber strips to form a monocoat or a multi-layer coating. The coating layers, except for the last coating layer of the multi-layered coatings, were cured for one hour at ambient conditions, 10 minutes at 49° C. (120° F.), and 30 minutes at 82° C. (180° F.). The last coating layer of the multi-layered coatings was allowed to stand for 10 minutes at ambient conditions, 10 minutes at 49° C. (120° F.) and 30 minutes at 82° C. (180° F.). Some coated rubber samples were flexed on a Dematta fatigue flex tester (commercially available from Qualitest Inc.) for 10,000 cycles. The various components of each coating layer and their respective oxygen transmission rates are listed in Table 19.

TABLE 19

| | Not Flexed | | Flexed 10,000 Cycles | |
|---|---|---|---|---|
| Coating | Thickness (mm) | Oxy Trans Rate [19] | Thickness (mm) | Oxy Trans Rate [19] |
| None | 1.30 | 43.3 | N/A | N/A |
| Monocoat [20] | 1.32 | 23.7 | 1.46 | 21.1 |
| Multi-layer coat A [21] | 1.43 | 12.3 | 1.52 | 11.0 |
| Multi-layer coat B [22] | N/A | N/A | 1.60 | 3.2 |

[19] Oxy Trans Rate = Oxygen transmission rate, units are cc/100 in$^2$/day-atm.
[20] A monocoat prepared from the coating composition of Part A.
[21] A multi-layer coating comprising a coating formed from the coating composition of Part A as the first coating layer applied over the rubber strip and an aqueous dispersion of MICROLITE® 963++ (a waterborne vermiculite dispersion commercially available from Specialty Vermiculite Corp.) as the second coating layer applied over the first coating layer.
[22] A multi-layer coating comprising a coating formed from the coating composition of Part A as the first coating layer applied over the rubber strip, an aqueous dispersion of MICROLITE® 963++ as the second coating layer applied over the first coating layer, and another sample of the coating composition of Part A as the third coating layer applied over second coating layer.

As shown in Table 19, the additional coating layers further decreased the oxygen transmission rate even when applied on a rubber strip and flexed for 10,000 cycles.

Example 23

Preparation and Evaluation of a Multi-Layer Coating

Part A: A polyurethane dispersion was prepared according to Examples 1 and 2 of U.S. Pat. No. 8,716,402, which is incorporated by reference herein. A coating composition was then prepared with 93 weight % of the polyurethane dispersion and about 7 weight % of BYK®-425 (a rheological additive, commercially available from BYK). The coating composition was applied onto a polypropylene sheet cleaned with isopropanol and allowed to stand at room temperature until the coating dried. The resulting coating exhibited an oxygen permeance of 8.2 cc·mm/m$^2$·day·atm at 23° C. and 50% relative humidity, and an elongation at break at −40° C. of 0.7%. The oxygen permeance and elongation at break were determined as previously described.

Part B: A coating composition comprising a polysulfide, a polyvinylidene chloride polymer, and a polyurethane was prepared according to Example 12 of U.S. Patent Application Publication No. 2015/0368512 and Examples 1 and 2 of U.S. Pat. No. 8,716,402, which are incorporated by reference herein.

Part C: After preparing the coating compositions, 51 μm (2 mil) thick films of polypropylene sheets were cleaned with isopropanol. The coating compositions of Parts A and B were then applied to different polypropylene sheets. Each coated sheet was placed in an oven for one hour at 49° C. (120° F.) before increasing the temperature to 107° C. (225° F.) for 30 minutes. The coated sheets were removed from the oven and allowed to cool for 30 minutes at room temperature. The sheets coated with the composition of Part B were further coated with the polyurethane dispersion of Part A and allowed to stand for 45 minutes at room temperatures. Some of the resulting coated sheets were then coated with another layer of the composition of Part B, placed in an oven for one hour at 49° C. (120° F.) before increasing the temperature to 107° C. (225° F.) for 30 minutes, and allowed to cool for 30 minutes at room temperature. The various components of each coating layer and their respective oxygen transmission rates/permeance rates are listed in Table 20.

TABLE 20

| Coating | Coating Thickness (mm) | $O_2$ Permeance [11] | $O_2$ Transmission Rate [19] |
|---|---|---|---|
| None | N/A | 48.2 | 49.5 |
| Monocoat [23] | 3 | 92.2 | 33.2 |
| Multi-layer coat A [24] | 5.9 | 5.0 | 2.07 |
| Multi-layer coat B [25] | 7.7 | 6.3 | 1.95 |

[23] A monocoat prepared from the coating composition of Part B.
[24] A multi-layer coating comprising a coating formed from the coating composition of Part B as the first coating layer applied over the polypropylene sheet and a coating formed from the polyurethane dispersion of Part A as the second coating layer applied over the first coating layer.
[25] A multi-layer coating comprising a coating formed from the coating composition of Part B as the first coating layer applied over the polypropylene sheet, a coating formed from the polyurethane dispersion of Part A as the second coating layer applied over the first coating layer, and another sample of the coating composition of Part B as the third coating layer applied over the second layer.

As shown in Table 20, the additional coating layers further decreased the oxygen permeance and transmission rates.

Example 24

Preparation and Evaluation of a Multi-Layer Coating

Part A: A polyurethane dispersion was prepared according to Examples 1 and 2 of U.S. Pat. No. 8,716,402, which is incorporated by reference herein.

Part B: A coating composition comprising a polysulfide, a polyvinylidene chloride polymer, and a polyurethane was prepared according to Example 12 of U.S. Patent Application Publication No. 2015/0368512 and Examples 1 and 2 of U.S. Pat. No. 8,716,402, which are incorporated by reference herein.

Part C: After preparing the coating compositions, ply rubber sheets were sanded with 100 grit sandpaper, brushed with a short bristle chip brush, and cleaned with an 80% heptane/20% acetone cleaning solution. The coating compositions of Parts A and B were then drawn down on different sheets with a 0.003-inch flat draw down bar. Each coated sheet was placed in an oven for one hour at 42° C. (120° F.) before increasing the temperature to 107° C. (225° F.) for 30 minutes. The coated sheets were removed from the oven and allowed to cool for 30 minutes at room temperature. The sheets coated with the composition of Part B were further coated with the polyurethane dispersion of Part A and allowed to stand for 45 minutes at room temperatures. Some coated rubber samples were flexed on a Demattia fatigue flex tester (commercially available from Qualitest Inc.) for 100,000 cycles. The various components of each coating layer and their respective oxygen transmission rates/permeance rates are listed in Table 21.

TABLE 21

| Coating | Substrate Thickness (mm) | Coating Thickness (mm) | $O_2$ Permeance [11] | $O_2$ Transmission Rate [19] |
|---|---|---|---|---|
| No coating/not flexed [26] | 47 | N/A | 859 | 45.2 |
| No coating/flexed [27] | 55 | N/A | 985 | 44.2 |
| Multi-layer coat/not flexed [28] | 47 | 4.6 | 11.6 | 6.16 |
| Multi-layer coat/flexed [29] | 55 | 3.0 | 15.3 | 12.38 |

[26] An uncoated ply rubber sheet that was not flexed.
[27] An uncoated ply rubber sheet that was flexed for 100,000 cycles.
[28] A multi-layer coating comprising a coating formed from the coating composition of Part B as the first coating layer applied over the ply rubber sheet and a coating formed from the polyurethane dispersion of Part A as the second coating layer applied over the first coating layer. The coated substrate was not flexed.
[29] A multi-layer coating comprising a coating formed from the coating composition of Part B as the first coating layer applied over the ply rubber sheet and a coating formed from the polyurethane dispersion of Part A as the second coating layer applied over the first coating layer. The coated substrate was flexed for 100,000 cycles.

As shown in Table 21, the additional coating layers further decreased the oxygen permeance and transmission rate. Further, the coated substrates that were flexed for 100,000 cycles did not exhibit a substantial change in gas barrier performance.

In view of the foregoing, the present invention is also directed to the following aspects, without being limited thereto.

Aspect 1: A coating composition for forming an elastic barrier coating, the coating composition comprising: (a) an aqueous carrier medium; (b) at least a first polymer comprising: (i) a barrier segment comprising aromatic groups and urethane linkages, urea linkages, or a combination thereof; and (ii) an elastomeric segment that is different from (i) having a glass transition temperature of less than 0° C., wherein the barrier segment comprises at least 30 weight % of the polymer based on the total solids weight of the polymer; and (c) polymeric core-shell particles dispersed in the aqueous carrier medium.

Aspect 2: The coating composition of aspect 1, wherein the elastomeric segment comprises ester linkages, ether linkages, sulfide linkages, natural rubber, synthetic rubber, or combinations thereof.

Aspect 3: The coating composition of any of aspects 1 or 2, wherein the barrier segment has a glass transition temperature of greater than 0° C.

Aspect 4: The coating composition of any of aspects 1 to 3, wherein the elastomeric segment has a glass transition temperature of less than −20° C.

Aspect 5: The coating composition of any of aspects 1 to 4, wherein the backbone of the shell of the core-shell particles comprises a polymeric material having urethane linkages, urea linkages, or a combination thereof.

Aspect 6: The coating composition of any of aspects 1 to 5, wherein the shell of the core-shell particles comprises a polymer comprising keto functional groups, aldo functional groups, carboxylic acid functional groups, or a combination thereof.

Aspect 7: The coating composition of any of aspects 1 to 6, wherein at least a portion of the shell of the core-shell particles is covalently bonded to at least a portion of the core.

Aspect 8: The coating composition of any of aspect 1 to 7, wherein the core of the core-shell particles comprises a polymeric material comprising structural units derived from polymerization of one or more ethylenically unsaturated monomer(s), preferably a (meth)acrylate monomer, a vinyl monomer, or a combination thereof.

Aspect 9: The coating composition of any of aspects 1 to 8, further comprising a crosslinker reactive with at least one of the first polymer and the core-shell particles.

Aspect 10: The coating composition of aspect 9, wherein the crosslinker comprises a hydrazide, a carbodiimide, or a combination thereof.

Aspect 11: The coating composition of aspects 1 to 10, wherein the coating composition comprises at least two different crosslinkers, and wherein at least one of the crosslinkers is reactive with the first polymer.

Aspect 12: The coating composition of any of aspects 1 to 11, further comprising at least one additional polymer that is different from the first polymer.

Aspect 13: The coating composition of aspect 12, wherein the additional polymer comprises a polyester, a polyether, a polysulfide, natural rubber, synthetic rubber, copolymers thereof, or a combination thereof.

Aspect 14: The coating composition of any of aspects 1 to 13, further comprising a platy inorganic filler.

Aspect 15: A method of applying a coating to a substrate comprising: (a) applying the coating composition according to any of aspects 1 to 14 to a first substrate; (b) removing substantially all water of the coating compositions to evaporate and form an elastic barrier film; (c) removing the elastic barrier film from the first substrate; and (d) applying the elastic barrier film to a second substrate.

Aspect 16: The method according to aspect 15, further comprising curing and/or drying the elastic barrier film after step (d).

Aspect 17: The method according to aspects 15 or 16, wherein the coating composition is spray applied to the first substrate in step (a).

Aspect 18: The method according to any of aspect 15 to 17, wherein the removal of the water in step (b) comprises heating the coating composition to a temperature of 25° C. to 150° C.

Aspect 19: The method according to any of aspects 15 to 18, wherein the curing and/or drying of the elastic barrier film comprises: (i) applying actinic radiation; (ii) applying convective heat; (iii) applying the elastic barrier film to the second substrate while the second substrate is heated above ambient temperatures; or a combination thereof.

Aspect 20: The method according to any of aspects 15 to 19, wherein the curing and/or drying of the elastic barrier film comprises maintaining the elastic barrier film on the second substrate at ambient conditions for a time sufficient to allow the curing and/or drying of the elastic barrier film.

Aspect 21: A multi-layer coating comprising: (a) a first coating layer formed from a first coating composition comprising: (1) the coating composition according to any of aspects 1 to 14; (2) a polysulfide and a second polymer having an oxygen permeance of 40 or less cc·mm/m²·day·atm at 23° C. and 50% relative humidity; or (3) a combination thereof; and (b) a second coating layer comprising an oxygen permeance at 23° C. and 50% relative humidity that is greater than an oxygen permeance at 23° C. and 50% relative humidity of the first coating layer, wherein the first coating layer is applied over at least a portion of a substrate and the second coating layer is applied over at least a portion of the first coating layer, or the second coating layer is applied over at least a portion of a substrate and the first coating layer is applied over at least a portion of the second coating layer.

Aspect 22: The multi-layer coating of aspect 21, further comprising a third coating layer formed from a third coating composition comprising components selected from (1) the coating composition according to any of aspects 1 to 14 and/or (2) a polysulfide and a second polymer having an oxygen permeance of 40 or less cc·mm/m²·day·atm at 23° C. and 50% relative humidity, wherein the second coating layer is positioned between the first coating layer and the third coating layer.

Aspect 23: The multi-layer coating of aspects 21 or 22, wherein the first coating composition comprises the coating composition of (1) the coating composition according to any of aspects 1 to 14, and wherein the first composition further comprises a crosslinker reactive with at least one of the first polymer and the core-shell particles.

Aspect 24: A coating composition for forming an elastic barrier coating, the coating comprising: (a) an aqueous carrier medium; (b) at least a first polymer comprising: (i) a barrier segment comprising aromatic groups and urethane linkages, urea linkages, or a combination thereof; and (ii) an elastomeric segment comprising ester linkages, ether linkages, or a combination thereof, wherein the barrier segment comprises at least 30 weight % of the polymer based on the total solids weight of the polymer; (c) polymeric core-shell particles dispersed in the aqueous carrier medium comprising a polymeric core at least partially encapsulated by a polymeric shell, wherein the polymeric core comprises a (meth)acrylate polymer and the polymeric shell comprises (i) urethane and urea linkages and (ii) keto functional groups, aldo functional groups, carboxylic acid functional groups, or a combination thereof, and wherein at least a portion of the polymeric shell is covalently bonded to at least a portion of the polymeric core; and (d) a crosslinker reactive with at least one of the first polymer and the core-shell particles.

Aspect 25: A substrate at least partially coated with a coating formed from the coating composition of any of the preceding aspects 1 to 14 or 24 or coated with a multi-layer coating of any one of the preceding aspects 21 to 23.

Aspect 26: The substrate according to aspect 25, wherein the substrate comprises an elastomeric substrate.

Whereas particular embodiments of this invention have been described above for purposes of illustration, it will be evident to those skilled in the art that numerous variations of the details of the present invention may be made without departing from the invention as defined in the appended claims.

The invention claimed is:

1. A coating composition for forming an elastic barrier coating, the coating composition comprising:
   an aqueous carrier medium;
   at least a first polymer comprising: (i) a barrier segment comprising aromatic groups and urethane linkages, urea linkages, or a combination thereof, having a glass transition temperature of greater than 0° C.; and (ii) an elastomeric segment that is different from (i) having a glass transition temperature of less than 0° C., wherein the barrier segment comprises at least 30 weight % of the polymer based on the total solids weight of the polymer; and
   polymeric core-shell particles dispersed in the aqueous carrier medium.

2. The coating composition of claim 1, wherein the elastomeric segment comprises ester linkages, ether linkages, sulfide linkages, natural rubber, synthetic rubber, or combinations thereof.

3. The coating composition of claim 1, wherein the elastomeric segment has a glass transition temperature of less than −20° C.

4. The coating composition of claim 1, wherein the backbone of the shell of the core-shell particles comprises a polymeric material having urethane linkages, urea linkages, or a combination thereof.

5. The coating composition of claim 1, wherein the shell of the core-shell particles comprises a polymeric material having keto functional groups, aldo functional groups, carboxylic acid functional groups, or a combination thereof.

6. The coating composition of claim 1, wherein at least a portion of the polymeric shell is covalently bonded to at least a portion of the polymeric core.

7. The coating composition of claim 1, wherein the core of the core-shell particles comprises a (meth)acrylate polymer, a vinyl polymer, or a combination thereof.

8. The coating composition of claim 1, further comprising a crosslinker reactive with at least one of the first polymer and the core-shell particles.

9. The coating composition of claim 8, wherein the crosslinker comprises a polyhydrazide, a carbodiimide, or a combination thereof.

10. The coating composition of claim 8, wherein the coating composition comprises at least two different crosslinkers, and wherein at least one of the crosslinkers is reactive with the first polymer.

11. The coating composition of claim 1, further comprising at least one additional polymer that is different from the first polymer.

12. The coating composition of claim 11, wherein the additional polymer comprises a polyester, a polyether, a polysulfide, natural rubber, synthetic rubber, copolymers thereof, or a combination thereof.

13. The coating composition of claim 1, further comprising a platy inorganic filler.

14. A substrate at least partially coated with a coating formed from the coating composition of claim 1.

15. A method of applying a coating comprising:
(a) applying the coating composition according to claim 1 to a first substrate;
(b) removing substantially all water of the coating composition to evaporate and form an elastic barrier film;
(c) removing the elastic barrier film from the first substrate; and
(d) applying the elastic barrier film to a second substrate.

16. A multi-layer coating comprising:
a first coating layer formed from a first coating composition comprising:
(1) the coating composition according to claim 1; and optionally
(2) a polysulfide and a second polymer having an oxygen permeance of 40 or less cc·mm/m$^2$·day·atm at 23° C. and 50% relative humidity; and
a second coating layer comprising an oxygen permeance number at 23° C. and 50% relative humidity that is lower than an oxygen permeance at 23° C. and 50% relative humidity of the first coating layer,
wherein the first coating layer is applied over at least a portion of a substrate and the second coating layer is applied over at least a portion of the first coating layer, or the second coating layer is applied over at least a portion of a substrate and the first coating layer is applied over at least a portion of the second coating layer.

17. The multi-layer coating of claim 16, wherein the first coating composition further comprises a crosslinker reactive with at least one of the first polymer and the core-shell particles.

18. A coating composition for forming an elastic barrier coating, the coating composition comprising:
(a) an aqueous carrier medium;
(b) at least a first polymer comprising: (i) a barrier segment comprising aromatic groups and urethane linkages, urea linkages, or a combination thereof; and (ii) an elastomeric segment comprising ester linkages, ether linkages, or a combination thereof, wherein the barrier segment comprises at least 30 weight % of the polymer based on the total solids weight of the polymer;
(c) polymeric core-shell particles dispersed in the aqueous medium comprising a polymeric core at least partially encapsulated by a polymeric shell, wherein the polymeric core comprises a (meth)acrylate polymer and the polymeric shell comprises (i) urethane and urea linkages and (ii) keto functional groups, aldo functional groups, carboxylic acid functional groups, or a combination thereof, and wherein at least a portion of the polymeric shell is covalently bonded to at least a portion of the polymeric core; and
(d) a crosslinker reactive with at least one of the first polymer and the core-shell particles.

19. A coating composition for forming an elastic barrier coating, the coating composition comprising:
an aqueous carrier medium;
at least a first polymer comprising: (i) a barrier segment comprising aromatic groups and urethane linkages, urea linkages, or a combination thereof; and (ii) an elastomeric segment that is different from (i) having a glass transition temperature of less than 0° C., wherein the barrier segment comprises at least 30 weight % of the polymer based on the total solids weight of the polymer;
polymeric core-shell particles dispersed in the aqueous carrier medium; and further comprising at least one additional polymer that is different from the first polymer and comprises a polyester, a polyether, a polysulfide, natural rubber, synthetic rubber, copolymers thereof, or a combination thereof.

* * * * *